(12) United States Patent
Saber et al.

(10) Patent No.: US 11,706,773 B2
(45) Date of Patent: Jul. 18, 2023

(54) SYSTEMS AND METHODS FOR COLLISION HANDLING AND SEMI-PERSISTENTLY SCHEDULED PHYSICAL DOWNLINK SHARED CHANNEL RELEASE

(71) Applicant: Samsung Electronics Co., Ltd., Suwon-si (KR)

(72) Inventors: Hamid Saber, San Diego, CA (US); Jung Hyun Bae, San Diego, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 212 days.

(21) Appl. No.: 17/148,443

(22) Filed: Jan. 13, 2021

(65) Prior Publication Data

US 2022/0030615 A1 Jan. 27, 2022

Related U.S. Application Data

(60) Provisional application No. 63/057,087, filed on Jul. 27, 2020.

(51) Int. Cl.
*H04W 72/23* (2023.01)
*H04L 5/00* (2006.01)
*H04W 72/044* (2023.01)

(52) U.S. Cl.
CPC ........... *H04W 72/23* (2023.01); *H04L 5/0055* (2013.01); *H04W 72/044* (2013.01)

(58) Field of Classification Search
CPC ........... H04W 72/1289; H04W 72/044; H04W 72/042; H04W 72/1273; H04W 72/0446; H04W 72/0453; H04W 72/14; H04W 72/1257; H04L 5/0055; H04L 5/001; H04L 5/0053; H04L 5/0092; H04L 1/1812; H04L 5/0044; H04L 1/08; H04L 1/1671; H04L 1/1854; H04L 5/0064; H04L 5/0078; H04L 27/26025
USPC ......................................................... 370/330
See application file for complete search history.

(56) References Cited

U.S. PATENT DOCUMENTS

| | | | |
|---|---|---|---|
| 2013/0301582 A1 | 11/2013 | Jiang et al. | |
| 2015/0043458 A1* | 2/2015 | Seo | H04L 1/1671 370/329 |
| 2018/0014284 A1 | 1/2018 | Yi et al. | |
| 2018/0331792 A1 | 11/2018 | Yang et al. | |

(Continued)

*Primary Examiner* — Mang Hang Yeung
(74) *Attorney, Agent, or Firm* — Lewis Roca Rothgerber, Christie LLP

(57) ABSTRACT

A method for releasing a semi-persistently scheduled (SPS) physical downlink shared channel (PDSCH) includes: receiving, by a PDSCH manager of a user equipment, a SPS release physical downlink control channel (PDCCH) in a scheduling cell, the SPS release PDCCH identifying N SPS PDSCH configuration indices to be released; identifying a slot of a scheduled cell, where the slot of the scheduled cell overlaps with the end of an ending symbol of the SPS release PDCCH; identifying M SPS PDSCH configuration indices including all configuration indices from among the N SPS PDSCH configuration indices that are scheduled in the slot; and releasing L SPS PDSCH configuration indices among the M SPS PDSCH configuration indices based on determining that the ending symbol of the SPS release PDCCH is before a corresponding ending symbol associated with each of the L SPS PDSCH configuration indices of the slot.

20 Claims, 19 Drawing Sheets

(56) References Cited

U.S. PATENT DOCUMENTS

2019/0090266 A1    3/2019  Zhao
2019/0306841 A1*  10/2019  Huang ................ H04W 76/34
2020/0205141 A1    6/2020  Khoshnevisan et al.

* cited by examiner

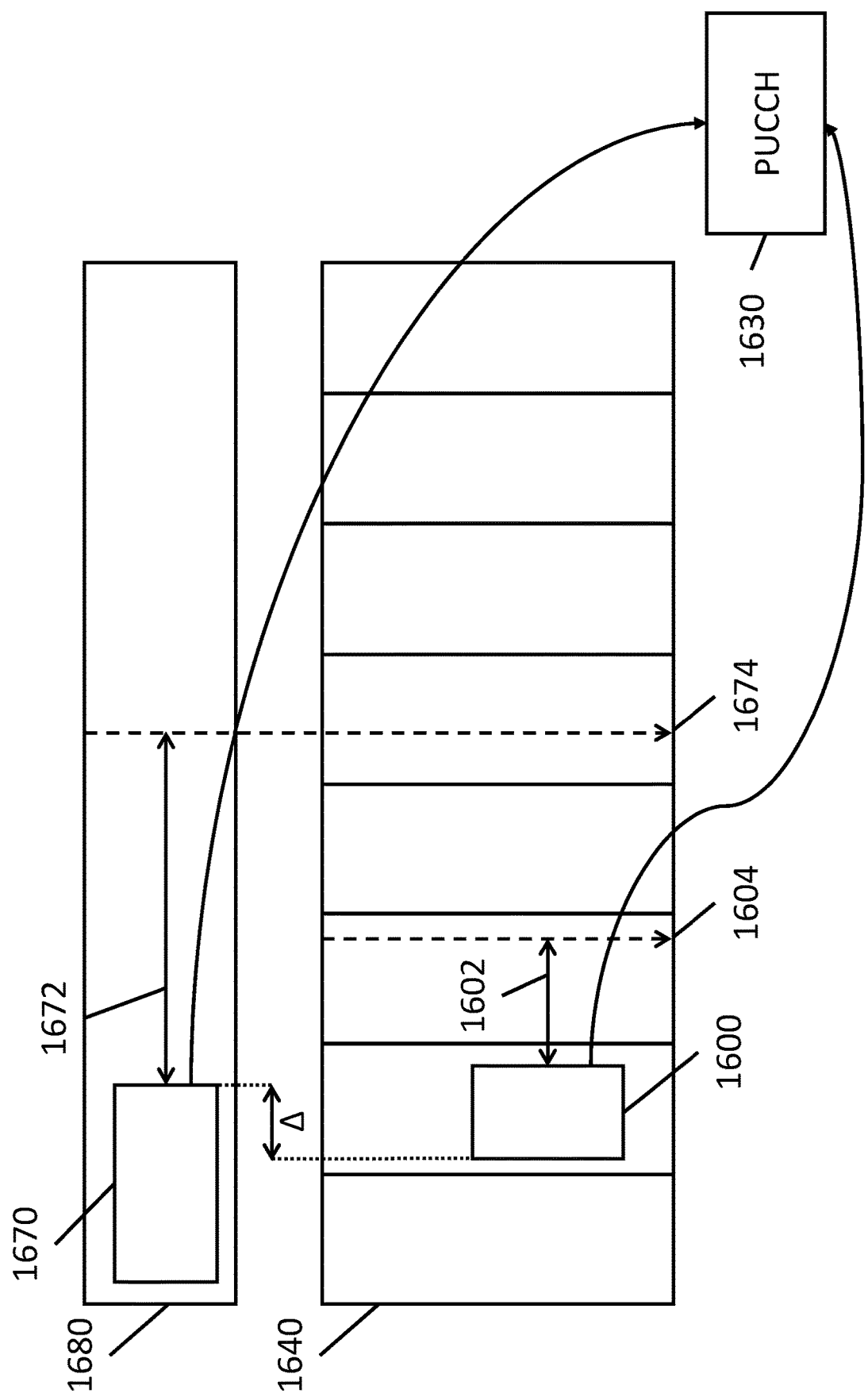

SYSTEMS AND METHODS FOR COLLISION HANDLING AND SEMI-PERSISTENTLY SCHEDULED PHYSICAL DOWNLINK SHARED CHANNEL RELEASE

CROSS-REFERENCE TO RELATED APPLICATION(S)

This application claims priority to and the benefit of U.S. Provisional Patent Application No. 63/057,087, filed in the United States Patent and Trademark Office on Jul. 27, 2020, the entire disclosure of which is incorporated by reference herein.

FIELD

Aspects of embodiments of the present disclosure relate to systems and methods for processing semi-persistently scheduled or dynamically scheduled channels in cellular communications protocols.

BACKGROUND

In cellular communications protocols, such as Release 15 of the 3rd Generation Partnership Project (3GPP) Fifth Generation New Radio (5G-NR) specifications for mobile networks, downlink traffic from a base station to user equipment (e.g., a smartphone) is wirelessly transmitted in signals that include a physical downlink shared channel (PDSCH) which can be either dynamically scheduled (dynamic grant or DG) or semi-persistently scheduled (SPS).

SUMMARY

Aspects of embodiments of the present disclosure relate to cellular communication protocols, including systems and methods implemented in user equipment (UE) for processing semi-persistently scheduled (SPS) or dynamically scheduled (or dynamic grant or DG) channels transmitted by a base station (or g node B or gNB).

According to one embodiment of the present disclosure, a method for jointly releasing multiple semi-persistently scheduled (SPS) physical downlink shared channels (PDSCHs) includes: receiving, by a PDSCH manager of a user equipment including a processor and memory, a SPS release physical downlink control channel (PDCCH) in a scheduling cell, the SPS release PDCCH identifying N SPS PDSCH configuration indices $i_1, \ldots, i_N$ to be released; identifying, by the PDSCH manager, a slot of a scheduled cell, where the slot of the scheduled cell overlaps with the end of an ending symbol of the SPS release PDCCH; identifying, by the PDSCH manager, M SPS PDSCH configuration indices $j_1, \ldots, j_M$ including all configuration indices from among the N SPS PDSCH configuration indices that are configured in the slot, where M≤N, the M SPS PDSCH configuration indices being associated with corresponding ending symbols; comparing, by the PDSCH manager, timings of the end of the ending symbol of the SPS release PDCCH and the corresponding ending symbols of the M SPS PDSCH configuration indices of the slot; and releasing, by the PDSCH manager, L SPS PDSCH configuration indices among the M SPS PDSCH configuration indices based on determining that the end of the ending symbol of the SPS release PDCCH is before a corresponding ending symbol associated with each of the L SPS PDSCH configuration indices of the slot.

An acknowledgement/negative-acknowledge bit (ACK/NACK) of the SPS release PDCCH and an ACK/NACK of L SPS PDSCH occasions from among a plurality of SPS PDSCH occasions identified by the M SPS PDSCH configuration indices may be mapped to a same physical uplink control channel (PUCCH).

The scheduling cell may have a first subcarrier spacing and the scheduled cell may have a second subcarrier spacing different from the first subcarrier spacing. The first subcarrier spacing of the scheduling cell may be lower than the second subcarrier spacing of the scheduled cell. The first subcarrier spacing of the scheduling cell may be higher than the second subcarrier spacing of the scheduled cell.

According to one embodiment of the present disclosure, a method for identifying jointly released multiple semi-persistently scheduled (SPS) physical downlink shared channels (PDSCHs) includes: identifying, by a PDSCH manager of a base station including a processor and memory, a slot of a scheduled cell that will overlap with the end of an ending symbol of a SPS release physical downlink control channel (PDCCH) identifying N SPS PDSCH configuration indices to be jointly released; identifying, by the PDSCH manager, M SPS PDSCH configuration indices $j_1, \ldots, j_M$ including all configuration indices from among the N SPS PDSCH configuration indices that are configured in the slot, where M≤N, the M SPS PDSCH configuration indices being associated with corresponding ending symbols; comparing, by the PDSCH manager, timings of the end of the ending symbol of the SPS release PDCCH and the corresponding ending symbols of the M SPS PDSCH configuration indices of the slot; and identifying, by the PDSCH manager, L released SPS PDSCH configuration indices among the M SPS PDSCH configuration indices based on determining that the end of the ending symbol of the SPS release PDCCH is before a corresponding ending symbol associated with each of the L released SPS PDSCH configuration indices of the slot.

An acknowledgement/negative-acknowledge bit (ACK/NACK) of the SPS release PDCCH and an ACK/NACK of L SPS PDSCH occasions from among a plurality of SPS PDSCH occasions identified by the M SPS PDSCH configuration indices may be mapped to a same physical uplink control channel (PUCCH).

The scheduling cell may have a first subcarrier spacing and the scheduled cell may have a second subcarrier spacing different from the first subcarrier spacing. The first subcarrier spacing of the scheduling cell may be lower than the second subcarrier spacing of the scheduled cell. The first subcarrier spacing of the scheduling cell may be higher than the second subcarrier spacing of the scheduled cell.

According to one embodiment of the present disclosure, a method for releasing a semi-persistently scheduled (SPS) physical downlink shared channel (PDSCH) with an aggregation factor includes: receiving, by a PDSCH manager of a user equipment including a processor and memory, a SPS release physical downlink control channel (PDCCH) in a scheduling cell, the SPS release PDCCH identifying a SPS PDSCH configuration index, the SPS PDSCH configuration index being associated with a SPS PDSCH configured with an aggregation factor in a scheduled cell; identifying, by the PDSCH manager, a timing of an ending symbol of a last repetition of the SPS PDSCH configured with the aggregation factor; comparing, by the PDSCH manager, a timing of an ending symbol of the SPS release PDCCH with the timing of the last symbol of the last repetition of the SPS PDSCH configured with the aggregation factor; and releasing, by the PDSCH manager, the SPS PDSCH configuration index based on determining that the end of the ending symbol of the SPS release PDCCH is before the last symbol of the last repetition of the SPS PDSCH configured with the aggregation factor.

An acknowledgement/negative-acknowledge bit (ACK/NACK) of the SPS release PDCCH and an ACK/NACK of the SPS PDSCH configured with the aggregation factor may be mapped to a same physical uplink control channel (PUCCH).

The scheduling cell may have a first subcarrier spacing and the scheduled cell may have a second subcarrier spacing different from the first subcarrier spacing. The first subcarrier spacing of the scheduling cell may be lower than the second subcarrier spacing of the scheduled cell.

The SPS release PDCCH may identify a plurality of SPS PDSCH configuration indices to be released.

According to one embodiment of the present disclosure, a method for identifying a released semi-persistently scheduled (SPS) physical downlink shared channel (PDSCH) with aggregation factor (AF) includes: identifying, by a PDSCH manager of a base station including a processor and memory, a timing of an ending symbol of a last repetition of the SPS PDSCH with AF in a scheduled cell; identifying, by the PDSCH manager, a timing of an ending symbol of a release physical downlink control channel (PDCCH) in a scheduling cell; comparing, by the PDSCH manager, the timing of the end of the ending symbol of the SPS release PDCCH and the timing of the end of the ending symbol of the last repetition of the SPS PDSCH with AF; and identifying, by the PDSCH manager, that the SPS PDSCH with AF is released when the end of the ending symbol of the SPS release PDCCH is before the end of the ending symbol of the last repetition of the SPS PDSCH with AF.

An acknowledgement/negative-acknowledge bit (ACK/NACK) of the SPS release PDCCH and an ACK/NACK of the SPS PDSCH configured with the aggregation factor may be mapped to a same physical uplink control channel (PUCCH).

The scheduling cell may have a first subcarrier spacing and the scheduled cell has a second subcarrier spacing different from the first subcarrier spacing. The first subcarrier spacing of the scheduling cell may be lower than the second subcarrier spacing of the scheduled cell.

The SPS release PDCCH may identify a plurality of SPS PDSCH configuration indices to be released.

BRIEF DESCRIPTION OF THE DRAWINGS

The accompanying drawings, together with the specification, illustrate exemplary embodiments of the present invention, and, together with the description, serve to explain the principles of the present invention.

FIG. 16 is a schematic diagram depicting a cross-carrier SPS PDSCH release.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

In cellular communications, such as Release 15 (Rel-15) of the 3rd Generation Partnership Project (3GPP) new radio (NR) technology (e.g., fifth generation new radio or 5G-NR) for mobile networks, downlink traffic from a base station or g Node B (gNB) to a mobile station or user equipment (e.g., a smartphone) is transmitted in physical downlink shared channels (PDSCHs) which can be either dynamically scheduled (dynamic grant or DG) or semi-persistently scheduled (SPS).

A DG PDSCH is scheduled by a scheduling physical downlink control channel (PDCCH) which is used to convey the downlink control information (DCI) to the user equipment (UE) such as a smartphone, a tablet computer, a Wi-Fi hotspot, and the like. The DCI includes, among other information, the time and frequency resources in which UE can receive the DG PDSCH. According to Rel-15 of the 5G-NR standards, every DG PDSCH can only be received by first receiving the scheduling DCI.

Release-15 of the 5G-NR standards also define a semi-persistently scheduled (SPS) PDSCH, which makes it possible for the UE to receive PDSCHs without a corresponding scheduling DCI. In Release-15, SPS PDSCH is supported to provide contiguous downlink transmission without the need to schedule every individual PDSCH via a separate DCI.

For example, in SPS PDSCH, a base station (or g Node B or gNB) configures the UE with one or more SPS configurations via radio resource control (RRC) messages. A SPS configuration information element (IE) per serving cell per bandwidth part (BWP) includes periodicity, physical uplink control channel (PUCCH) resource information and other information required for SPS operation (see, e.g., 3GPP Technical Specification 38.331 Clause 6). For example, a SPS configuration information element may specify a periodicity for the SPS PDSCH occasions, e.g., how frequently the SPS PDSCH can be received. For example, under some circumstances, the minimum periodicity is 10 ms (10 slots for subcarrier spacing of 15 KHz).

Rel-15 of the 5G-NR supports at most one active SPS PDSCH configuration per bandwidth part (BWP) per serving cell. Furthermore, there can be at most one serving cell within each cell group that can be configured with a SPS PDSCH configuration. To provide more flexibility to the uRLLC UE, including lower latency, aspects of embodiments of the present disclosure relate to supporting multiple active SPS configurations per BWP per serving cell. Moreover, aspects of embodiments of the present disclosure allow the configuration of more than one cell with SPS configurations within each cell group.

Figure 1:
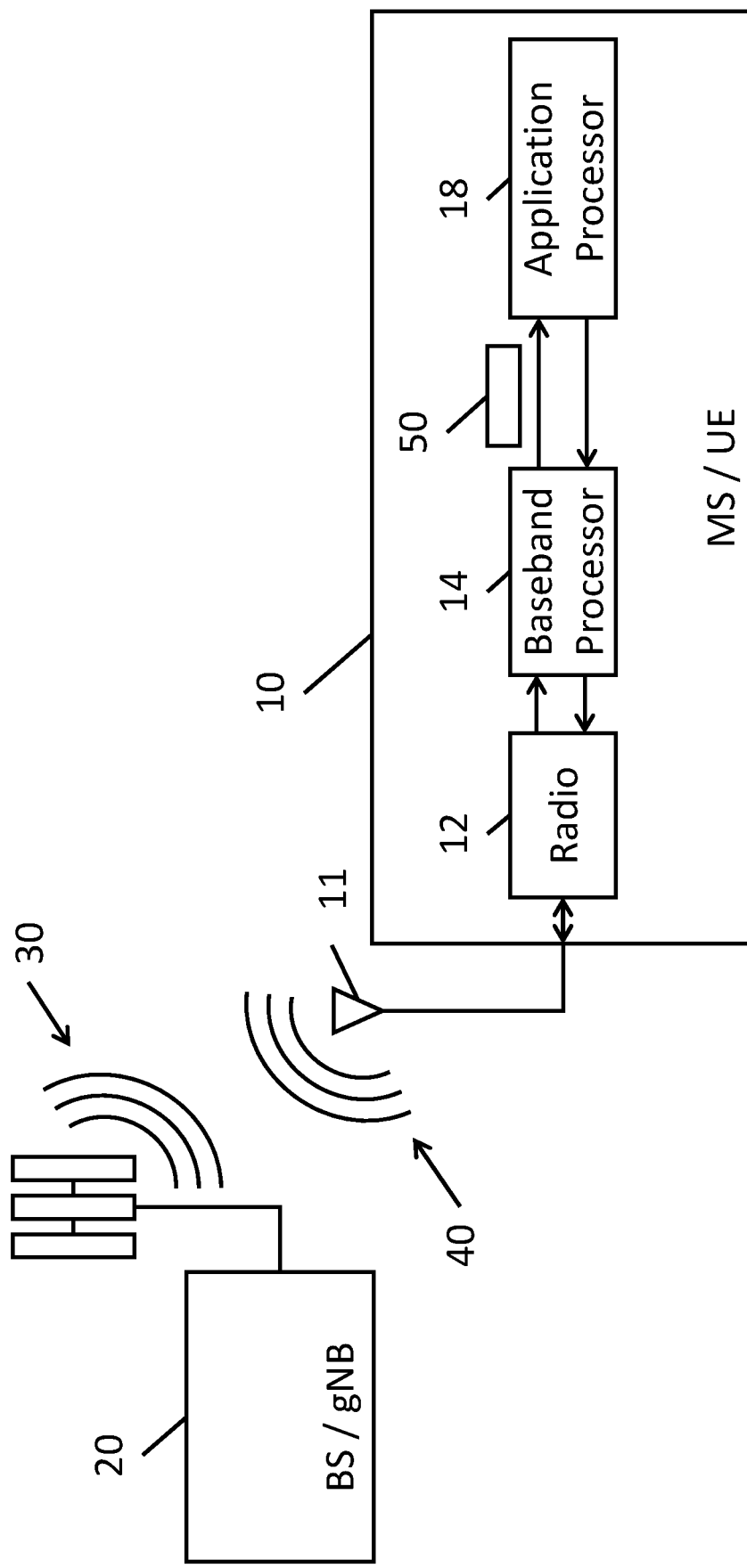
FIG. 1 is a schematic block diagram of a wireless communication system in which a base station (or g Node B or gNB) communicates with a mobile station (or user equipment or UE).

FIG. 1 is a schematic block diagram of a wireless communication system in which a base station (or g Node B or gNB) communicates with a mobile station (or user equipment or UE). As shown in FIG. 1, a mobile station 10 may include an antenna 11 that is configured to receive a downlink electromagnetic signal 30 (e.g., transmitted by a base station 20). The downlink electromagnetic signal 30 transmitted by the base station 20 includes one or more downlink channels such as PDSCHs. As shown in FIG. 1, the mobile station 10 may also transmit an uplink electromagnetic signal 40 to be received by the base station 20, where the uplink electromagnetic signal 40 includes one or more uplink channels such as a PUCCH.

The received downlink analog signal 30 may be supplied to a radio 12, which may apply various signal processing operations to the received analog signal to generate a digital signal, which may be further processed by baseband processor 14. In some circumstances, the radio 12 and the baseband processor may be integrated as a single unit. The baseband processor 14 generates digital information 50 decoded from the received signal 30 and may supply the decoded information, along with other information about the state of the communication, to an application processor (AP) 18. The digital information or data 50 may include a digital bitstream, to be supplied for consumption by applications running on the application processor 18 of the mobile station 10. The application processor 18 may execute an operating system (e.g., Google® Android®, Tizen™, Apple® iOS®, or the like) and the applications (or apps) may include, for example, a voice calling application, a video conferencing application, an email application, a web browser, or the like. The application processor 18 may also control aspects of the communication with the base station 20 via the baseband processor 14 and the radio 12.

Figure 2:
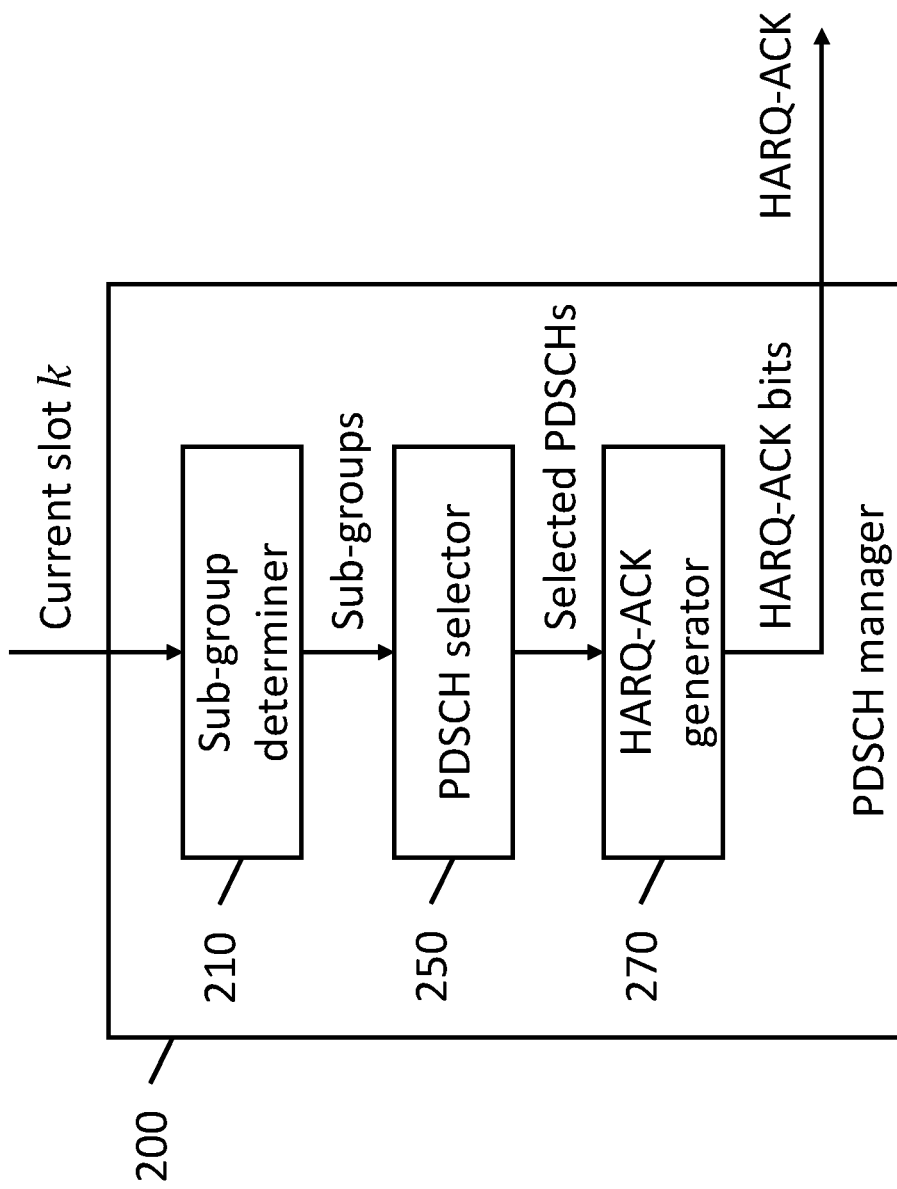
FIG. 2 is a block diagram illustrating a physical downlink shared channel (PDSCH) manager according to one embodiment of the present disclosure.

FIG. 2 is a block diagram illustrating a physical downlink shared channel (PDSCH) manager 200 according to one embodiment of the present disclosure. According to various embodiments of the present disclosure, the application processor 18 and/or the baseband processor 14 may implement the PDSCH manager. Referring to FIG. 2, the PDSCH manager includes a sub-group determiner 210 configured to group PDSCHs of a current slot k into one or more sub-group, a PDSCH selector 250 configured to select one or more PDSCHs to be received, and hybrid automatic repeat request acknowledgment (HARQ-ACK) generator 270 configured to generate HARQ-ACK bits to acknowledge (or, in some circumstances, negative-acknowledge) the reception of the selected PDSCHs (e.g., where the HARQ-ACK may be transmitted in a PUCCH on an uplink electromagnetic signal 40 from the mobile station 10 to the base station 20).

In various embodiments of the present disclosure, the components of the PDSCH manager 200, such as the sub-group determiner 210, the PDSCH selector 250, and the HARQ-ACK generator 270, may be implemented in one or more processing circuits (e.g., a radio baseband processor (BP or BBP), a central processing unit (CPU) or application processor (AP), a microcontroller, a digital signal processor (DSP), a field programmable gate array (FPGA), or an application specific integrated circuit (ASIC)) of a digital radio, where various portions of various blocks may be implemented in the same circuit (e.g., on the same die or in a same package) or in different circuits (e.g., on different dies or in different packages, connected over a communication bus).

Figure 3:
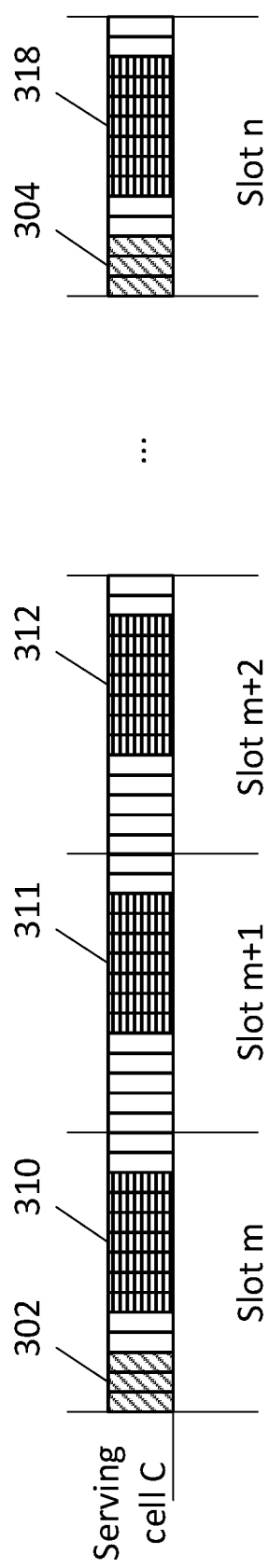
FIG. 3 is a schematic diagram illustrating the arrangement of a semi-persistently scheduled physical downlink shared channel (SPS PDSCHs) occasions over multiple slots of a serving cell.

FIG. 3 is a schematic diagram illustrating the arrangement of a semi-persistently scheduled physical downlink shared channel (SPS PDSCHs) occasions over multiple slots of a serving cell. A SPS configuration is activated by an activation DCI 302 which, in general can be any of the DCI formats which schedule a DG PDSCH with some additional validation mechanism performed, (see, e.g., 3GPP Technical Specification 38.213 Clause 10.2). Compared to a DCI scheduling a DG PDSCH, the 3GPP 5G-NR specification states that a SPS activation DCI is scrambled by configured grant radio network temporary identifier (CS-RNTI) and some specific DCI fields are specially used for identification of SPS activation, including new data indicator (NDI), hybrid automatic repeat request (HARQ) process number (HPN) and redundancy version (RV). The SPS activation DCI schedules the first SPS PDSCH occasion 310 in slot m in a manner similar to a DG PDSCH.

As shown in FIG. 3 the SPS activation DCI 302 is received in slot m and the SPS activation DCI indicates/schedules the first SPS PDSCH occasion 310 in slot m. The next SPS PDSCH occasions are determined according to the periodicity set by the SPS activation DCI 302 which, in this example, is a periodicity of 1 slot, as well as the time and frequency domain resource indicated by the SPS activation DCI 302. For example, within the SPS slots, the time and frequency resources follow that of the first SPS occasion (e.g., at the same offsets from the beginning of their respective slots). As another example, if the periodicity were set to 2 slots, then a first SPS PDSCH occasion would be scheduled in slot m, no SPS PDSCH occasion would be scheduled for slot m+1, and a second SPS PDSCH occasion would be scheduled in slot m+2, and so on. As shown in FIG. 3, no corresponding SPS activation DCI is needed in slot m+1 or in slot m+2 to receive the respective SPS PDSCH occasion 311 or SPS PDSCH occasion 312.

As shown in FIG. 3, a release DCI 304 in slot n (where n>m) releases the active SPS configuration. Although the release DCI 304 technically does not schedule a resource, in some embodiments, the release DCI 304 is associated with one last PDSCH occasion 318. In some embodiments, the last PDSCH occasion 318 is only used for semi-static HARQ-ACK codebook construction, in which case the user equipment may assume that there will be no SPS PDSCH reception during this last PDSCH occasion 318. According to Rel-15 of the 3GPP 5G-NR standards, there can be up to one active SPS configuration per bandwidth part (BWP) of a serving cell.

Aspects of embodiments of the present disclosure relate to providing more flexibility to the base station (or g node B or gNB) to schedule Ultra Reliable Low Latency Communications (uRLLC) and to satisfy the latency requirements, by allowing multiple active SPS configurations per serving cell per BWP. By allowing multiple active SPS configurations per BWP of a serving cell, it is possible that multiple active SPS occasions overlap in time and/or frequency in one slot.

Figure 4:
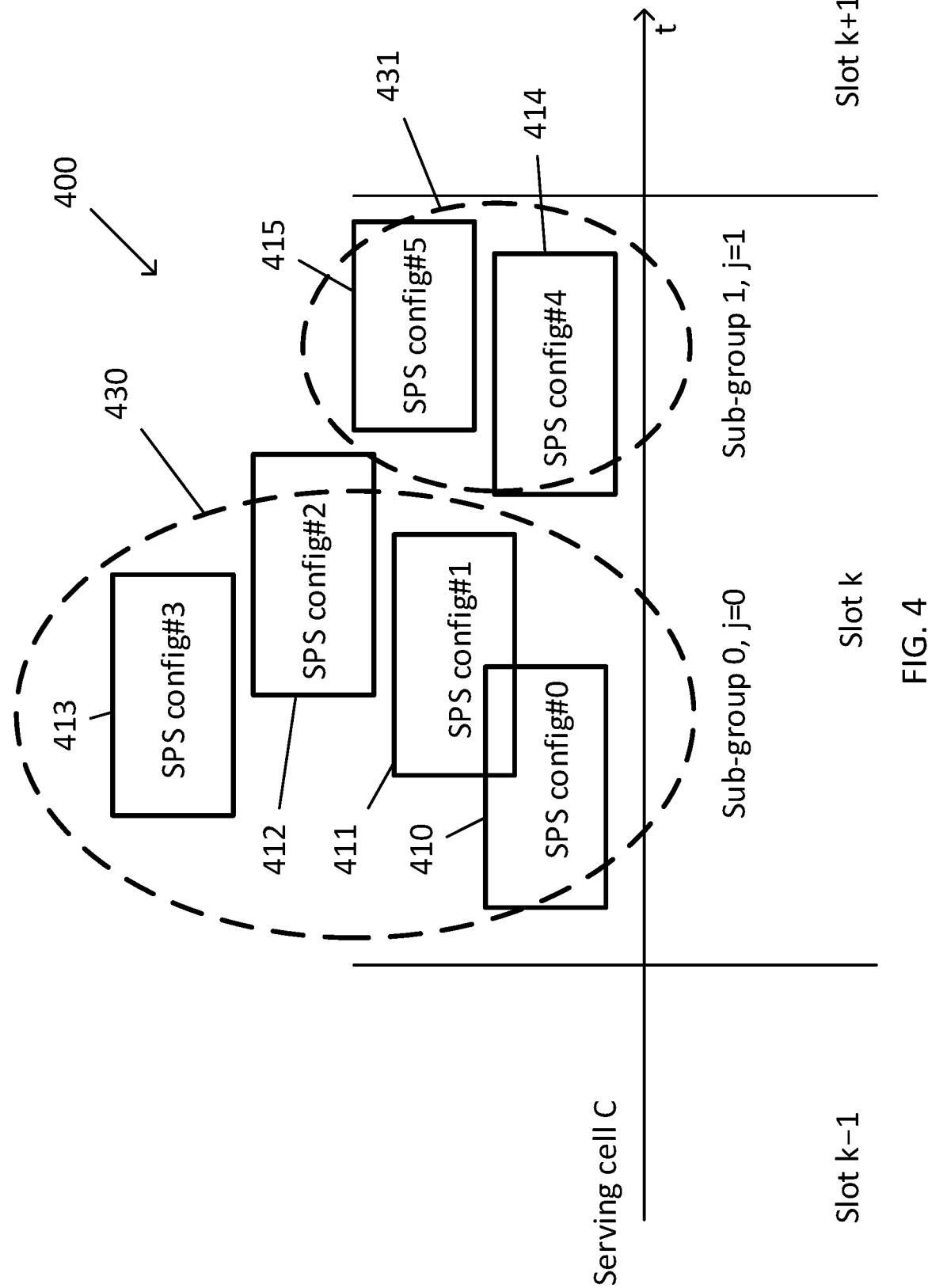
FIG. 4 is a schematic diagram illustrating a set of overlapping SPS PDSCH occasions and the corresponding type-1 hybrid automatic repeat request acknowledgment (HARQ-ACK) codebook sub-groups of the PDSCH occasions.

FIG. 4 depicts an example of a slot k of serving cell C in which six SPS PDSCH occasions 400 are scheduled to occur, some of which overlap. The horizontal axis in FIG. 4 indicates the time domain or time (t), and the vertical axis generally represents diversity in a different domain, such as the frequency domain and/or code division domain. The six SPS PDSCH occasions are labeled SPS config #0 410, SPS config #1 411, SPS config #2 412, SPS config #3 413, SPS config #4 414, and SPS config #5 415. In the embodiment described herein, the SPS PDSCH occasions are assigned indices in the order in which each of the SPS PDSCH occasions were scheduled by their corresponding activation DCIs (e.g., the mobile station received an activation DCI to schedule SPS config #0 410 before receiving any of the activation DC's that scheduled SPS config #1, SPS config #1 411, SPS config #2 412, SPS config #3 413, SPS config #4 414, and SPS config #5 415). In other embodiment of the present disclosure, the SPS PDSCH occasions are assigned their corresponding indices in accordance with a different rule (e.g., a combination of priority and order in which they were scheduled).

While FIG. 4 shows the SPS PDSCH occasions 400 scheduled for slot k, other slots may have different SPS PDSCH occasions scheduled, depending on the periodicity of the SPS PDSCHs. For example, one SPS configuration may schedule a SPS PDSCH with a periodicity of 2 and another SPS configuration may schedule a SPS PDSCH with a periodicity of 3. As such, these two configurations with cause respective SPS PDSCH occasions to appear in the same slot once every six slots (6 being the lowest common multiple of 2 and 3). As such, slot k−1 and slot k+1 may have different SPS occasions than the example slot k shown in FIG. 4.

In order to handle these multiple active SPS configurations, various aspects of embodiments of the present disclosure relate to systems and methods for determining which of the active SPS configurations are to be handled under circumstances where these SPS occasions overlap in time and/or frequency in one slot, as shown in FIG. 4 and the handling of release DCI commands to release SPS PDSCHs. Some aspects of embodiments of the present disclosure relate to addressing issues that were not present in Rel-15 of the 3GPP NR standard.

Handling Semi-Persistently Scheduled Physical Downlink Shared Channels in Release 16

FIG. 4 is a schematic diagram illustrating a set of overlapping SPS occasions and the corresponding type-1 hybrid automatic repeat request acknowledgment (HARQ-ACK) codebook sub-groups. Each of the SPS occasions 400 depicted boxes in FIG. 4 are the PDSCH candidates where base station 20 may possibly transmit the PDSCHs. In some instances, these candidates may be empty, for example, the base station 20 need to transmit a PDSCH for the UE in each scheduled SPS occasion. Each sub-group of overlapping PDSCHs can be defined according to Type-1 codebook sub-group. In particular, a PDSCH occasion with earliest last symbol is chosen and every other PDSCH which overlaps with this PDSCH is grouped into the first sub-group in slot. Excluding the PDSCHs in the first sub-group, a PDSCH with earliest last symbol is chosen and every other PDSCHs overlapping with this PDSCH is grouped into the second sub-group in the slot and so on (see, e.g., 3GPP Technical Specification 38.213, sub-clause 9.1.2).

In the particular example shown in FIG. 4, SPS config #0 410 has the earliest last symbol (e.g., the right edge of the box 410 is the earliest in time among all of the SPS PDSCH occasions 400). Every other PDSCH occasion which overlaps in time with SPS config #0 410 is then considered as part of the same sub-group as SPS config #0 410. Referring to FIG. 4, two PDSCH occasions overlap if a vertical line can be drawn through both boxes representing the PDSCH occasions. In the example shown in FIG. 4, SPS config #1 411, SPS config #2 412, and SPS config #3 413 all overlap in time with SPS config #0 and therefore are part of a sub-group. Of the remaining PDSCH occasions, SPS config #4 414 has the earliest last symbol (e.g., the right edge of SPS config #4 414 is earlier in time than the right edge of SPS config #5 415). SPS config #5 415 overlaps in time with SPS config #4 414 and therefore is part of the same sub-group as SPS config #4 414, and there are no remaining sub-groups.

Accordingly, based on Release 15 of the 5G-NR standards, in the type-1 HARQ-ACK codebook, SPS occasions for configurations 0 through 3 (SPS config #0 410, SPS config #1 411, SPS config #2 412, and SPS config #3 413) are sub-grouped together in sub-group #0 430 and SPS occasions for configurations 4 and 5 (SPS config #4 414 and SPS config #5 415) are sub grouped together in sub-group #1 431, thereby forming two sub-groups.

Problem A: PDSCH Collision and Release Handling

Generally, in Release 16 (Rel-16) of the 3rd Generation Partnership Project (3GPP) Fifth Generation New Radio (5G-NR) specifications for mobile networks, in the case of multiple active Semi-Persistently Scheduled (SPS) Physical Downlink Shared Channel (PDSCH) configurations on a bandwidth part (BWP) of a serving cell, the user equipment (UE) only receives certain SPS PDSCHs which are not overlapping, where the SPS PDSCHs to be received are determined by their SPS configuration indices. Referring to FIG. 4, in Release-16, the UE handles collisions between one or more PDSCHs without corresponding physical downlink control channel (PDCCH) transmissions as follows:

Step 0: set j=0, where j is the number of selected PDSCH(s) for decoding. Q is the set of activated PDSCHs without corresponding PDCCH transmissions within the slot Step 1: A UE receives one PDSCH with the lowest configured configuration index within Q, set j=j+1. Designate the received PDSCH as a survivor PDSCH.

Step 2: The survivor PDSCH in step 1 and any other PDSCH(s) overlapping (even partially) with the survivor PDSCH in step 1 are excluded or removed from Q.

Step 3: Repeat step 1 and 2 until Q is empty or j is equal to the number of unicast PDSCHs in a slot supported by the UE.

In the example, shown in FIG. 4, and assuming the UE supports handling up to two unicast PDSCHs in a slot, in Step 0 the PDSCH manager 200 initially adds all six SPS configurations shown in FIG. 4 to the set Q, sets j=0. In Step 1, the PDSCH manager 200 receives one PDSCH with the lowest configured configuration index, that is, SPS config #0 410, which is designated a survivor PDSCH and j is incremented to 1. In Step 2, the PDSCH manager 200 removes all PDSCHs overlapping with the survivor PDSCH SPS config #0 410. Because SPS config #1 411, SPS config #2 412, and SPS config #3 413 all overlap with SPS config #0 410, these three SPS configurations would be removed from Q, leaving only SPS config #4 414 and SPS config #5 415 in Q. In Step 3, because Q is not yet empty and because j is still less than the maximum supported number of PDSCHs (assumed to be 2), then the process continues with Step 1. In Step 1, the PDSCH manager 200 receives the PDSCH with the lowest configuration in Q. In this case this would be SPS config #4 414, which is designated a survivor PDSCH and j is incremented to 2. In Step 2, the PDSCH manager 200 removes SPS config #5 415 from Q because it overlaps with survivor PDSCH SPS config #4 414. In Step 3, the PDSCH manager 200 determines that the collision handling process is complete both because Q is now empty and because j is equal to the maximum number of PDSCHs that the UE supports in a slot (in this example, either condition along would be sufficient to end the collision handling process).

As noted above, a slot SPS release DCI may be transmitted via a PDCCH to release an active SPS configuration, where a UE is no longer expected to receive a previously-scheduled SPS PDSCH after it has received a corresponding release PDCCH for that active SPS configuration. In Release 16, this behavior involves supporting a case that if a slot SPS release PDCCH is received before the end of the SPS PDSCH reception for the same SPS configuration corresponding to the SPS release PDCCH, then a 1 bit HARQ-ACK is generated for SPS release and a UE does not expect to receive the SPS PDSCH if HARQ-ACKs for the SPS release and the SPS reception would map to the same physical uplink control channel (PUCCH). In addition, in Release 16, it is not supported that a SPS release PDCCH in a slot is received after the end of the SPS PDSCH reception in the slot for the same SPS configuration corresponding to the SPS release PDCCH if HARQ-ACKs for the SPS release and the SPS reception would map to the same PUCCH.

Furthermore, in Release 16, if a UE is configured to receive a SPS PDSCH in a slot for a SPS configuration, and if the UE receives a PDCCH indicating a SPS PDSCH release corresponding to the SPS configuration in the slot where the end of a last symbol or ending symbol of the PDCCH reception (as opposed to the beginning of the ending symbol of the PDCCH reception) is not after the end of a last symbol of the SPS PDSCH reception, and if HARQ-ACK information for the SPS PDSCH release and the SPS PDSCH reception would be multiplexed in a same PUCCH, the UE does not expect to receive the SPS PDSCH, does not generate HARQ-ACK information for the SPS PDSCH reception, and generates a HARQ-ACK information bit for the SPS PDSCH release (see, e.g., 3GPP Technical Specification 38.213 clause 9.1).

However, Release 16 of the 3GPP 5G-NR standard does not specify the order in which the above specifications of are applied, which can result in different outcomes, depending on how the specifications are interpreted by implementing cellular equipment such as the UE and the gNB. Different interpretations of the agreements by a UE and a gNB that are communicating with each other can cause data loss and/or communication inefficiencies due to different decisions about which of the active SPS configurations will be received and which will not be received.

Figure 5:
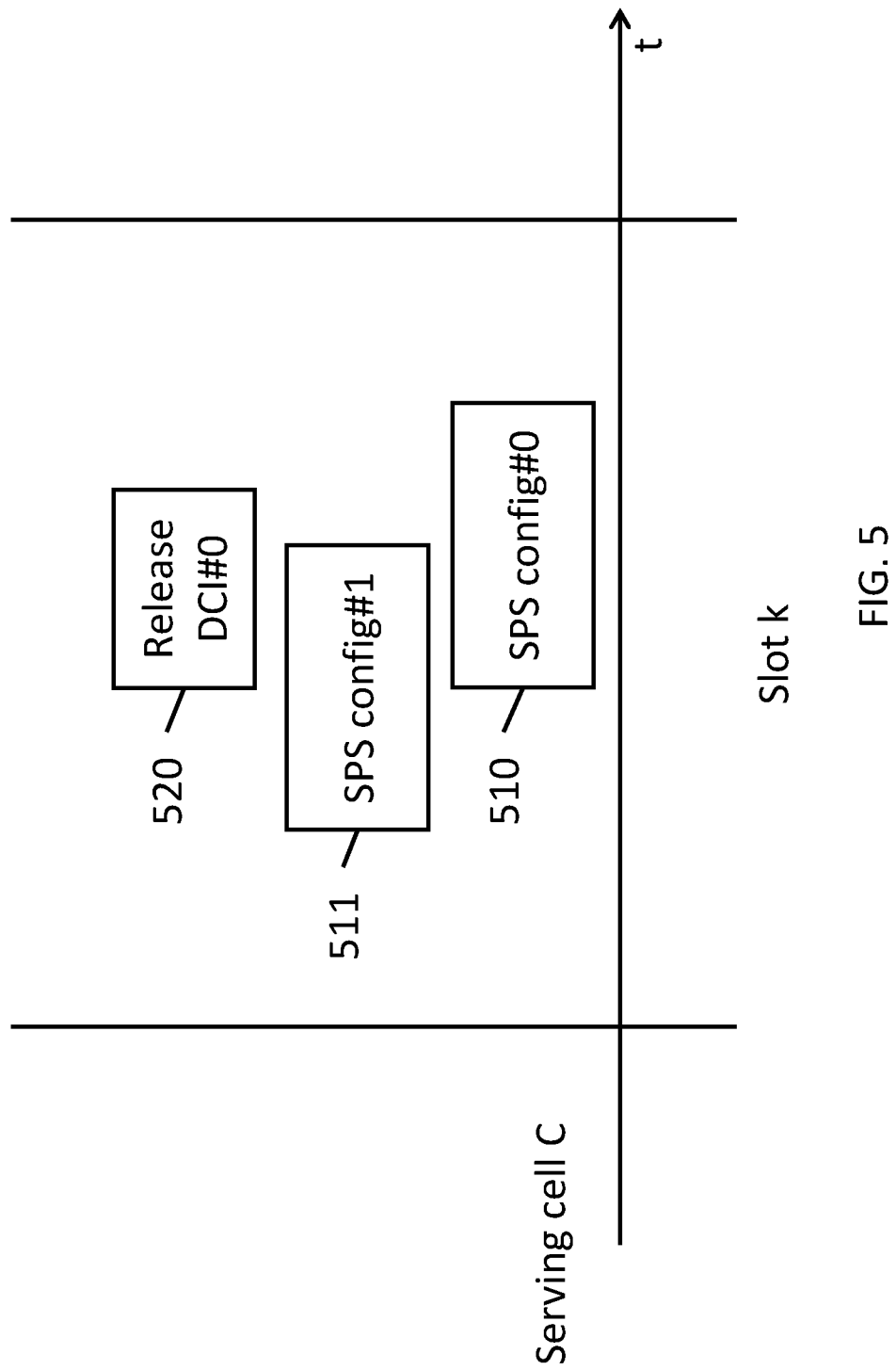
FIG. 5 is a schematic diagram illustrating a slot with two overlapping SPS PDSCH occasions and a release downlink control information (DCI) for one of the SPS PDSCH configurations.

FIG. 5 is a schematic diagram illustrating a slot with two overlapping SPS PDSCH occasions and a release DCI for one of the SPS PDSCH configurations. In the particular example slot shown in FIG. 5, SPS config #0 510 overlaps with SPS config #1 511. In addition, Release DCI #0 520 overlaps with both SPS config #0 510 and SPS config #1 511. The first symbol of SPS config #1 511 is earlier than the start of both SPS config #0 510 and release DCI #0 520 and the last symbol of SPS config #1 511 is before the end of both SPS config #0 510 and release DCI #0 520. The first symbols of release DCI #0 520 and SPS config #0 510 are aligned (e.g., at the same time), and the last symbol of release DCI #0 520 is before the last symbol of SPS config #0 510.

If the UE resolves the collision among the SPS PDSCHs first, then SPS config #0 510 is identified as the SPS PDSCH configuration with lowest index and the other overlapping PDSCH, SPS config #1 511 is removed and therefore SPS config #1 511 is removed. Next applying the rule regarding the release DCI, because the last symbol of the release DCI #0 520 is before the end of the corresponding SPS PDSCH occasion (SPS config #0 510), then SPS config #0 510 is released and therefore the corresponding occasion is not received. In addition, the acknowledgement/negative-acknowledgement (ACK/NACK) may be transmitted. For a "Type-1" HARQ-ACK codebook (CB), (NACK #1,ACK #0) is transmitted assuming two containers are available, (TDRA of SPS #1 and SPS #0 fall into two different subgroups for a Type-1 HARQ-ACK CB according to Technical Specification 38.213). For a "Type-2" HARQ-ACK CB, ACK #0 is transmitted.

On the other hand, if the UE addresses the release DCI first, then SPS config #0 510 is released and removed. After removing the PDSCH occasion corresponding to SPS config #0 510, the UE applies the collision resolution rule. In this particular example, only SPS config #1 511 remains and it does not overlap with any other PDSCH occasions in this slot and therefore SPS config #1 511 is received. In this case, for a Type-1 HARQ-ACK CB, (ACK #1,ACK #0) is transmitted assuming two containers are available (TDRA of SPS #1 and SPS #0 fall into two different subgroup for Type-1 CB according to TS 38.213). For a Type-2 HARQ-ACK CB, (ACK #0,ACK #1) is transmitted by appending ACK/NACK of SPS PDSCH config #1 511 to the end of the dynamic portion of the Type-2 CB which here is assumed to only include the release DCI for SPS config #0 510 (Release DCI #0 520).

Accordingly, FIG. 5 illustrates one example situation where the order in which the rules are applied by the UE causes different behavior, namely the reception or non-reception of SPS config #1 511.

Problem B: Joint SPS PDSCH Release Handling

Figure 6:
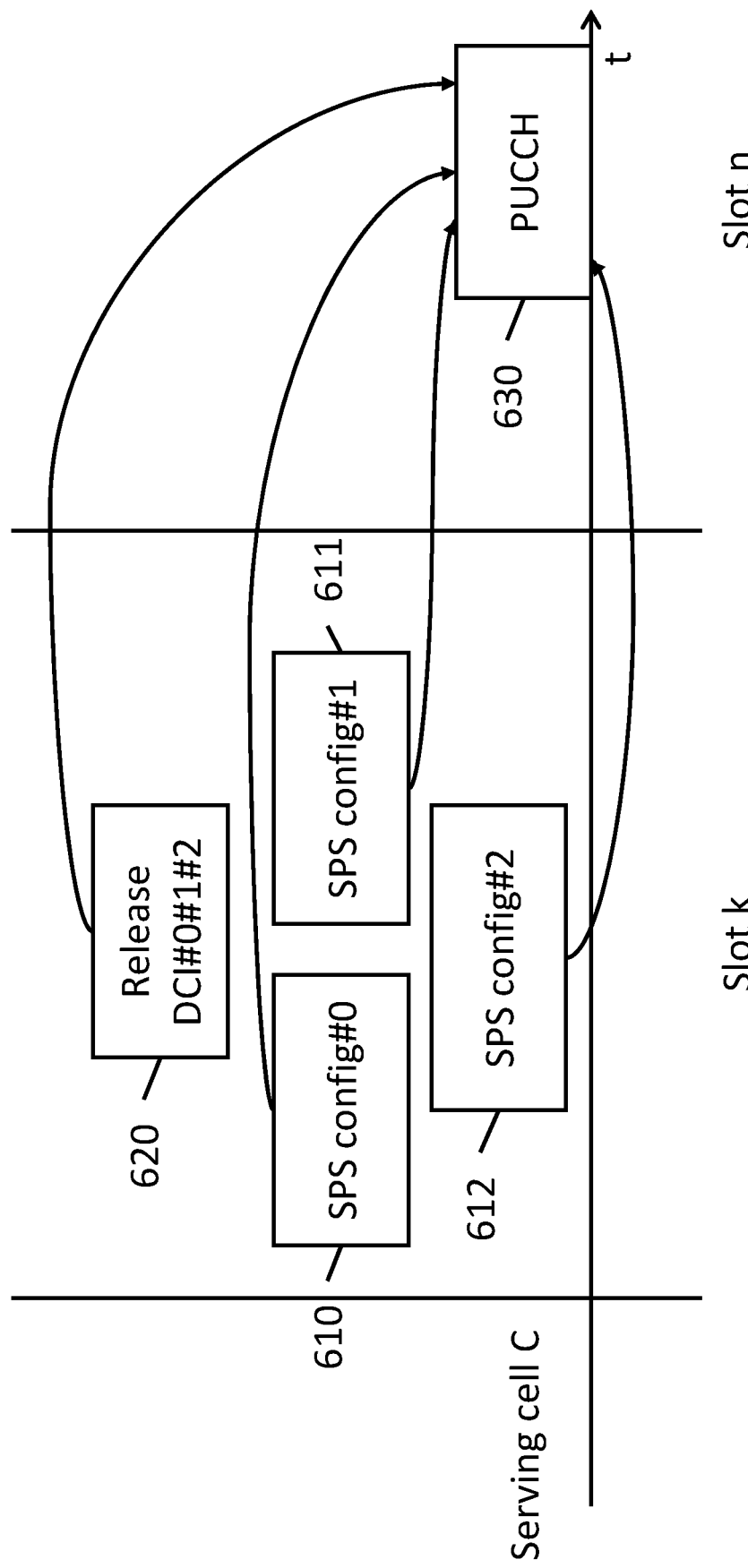
FIG. 6 is a schematic diagram illustrating a slot with three SPS PDSCH occasions and a joint release DCI identifying all three SPS PDSCH configurations.

Release 16 of the 3GPP 5G-NR specifies that a release DCI can be used to jointly release multiple SPS PDSCH configurations, as identified based on their indices. FIG. 6 is a schematic diagram illustrating a slot with three SPS PDSCH occasions and a joint release DCI identifying all three SPS PDSCH configurations. In the arrangement shown in FIG. 6, SPS config #0 610 has the earliest first symbol and its last symbol is before the start of SPS config #1 611. SPS config #2 612 starts during SPS config #0 610 and ends during SPS config #1 611 and therefore overlaps with both. Release DCI #0 #1 #2 620 identifies all three of the shown SPS PDSCH configurations SPS config #0 610, SPS config #1 611, and SPS config #2 612. The first symbol of Release DCI #0 #1 #2 620 occurs after the first symbol of SPS config #2 612, and before the end of SPS config #1 611. A UE may transmit responses (ACK/NACK messages) regarding these four communications in a PUCCH 630 in a later slot (Slot n).

Under one interpretation of the standards, the Release DCI #0 #1 #2 620 is not supported (e.g., not permitted under the standard) because the SPS config #0 610 ends before the end of the Release DCI #0 #1 #2 620. On the other hand, under another interpretation, the Release DCI #0 #1 #2 620 is supported because the SPS config #1 611 ends after the end of the release PDCCH. This situation may also take place in cross carrier scheduling with different numerologies when the sub-carrier spacing (SCS) of the release DCI is smaller than that of SPS PDSCH slot. In this case, the release PDCCH typically overlaps with multiple SPS PDSCH slots.

Problem C: SPS PDSCH Release with Aggregation Factor

In some circumstances, a SPS release DCI PDCCH overlaps with a single occasion of a SPS PDSCH with aggregation factor (e.g., where a SPS PDSCH is scheduled for multiple consecutive slots). In that case, some of the SPS PDSCH occasions will end before the end of the SPS release DCI PDCCH, while some other SPS PDSCH may end after the end of the release PDCCH. However, Rel-16 disallows this arrangement because one ACK/NACK is generated for the entire SPS PDSCH reception, if the ACK/NACK for PDSCH and release PDCCH are mapped to the same PUCCH. Not supporting this scenario will significantly reduce the network flexibility to release the SPS PDSCH with aggregation factor. A similar scenario is when the cross carrier (X-CC) SPS release PDCCH releases a SPS PDSCH configuration on a cell with larger numerology.

Figure 7:
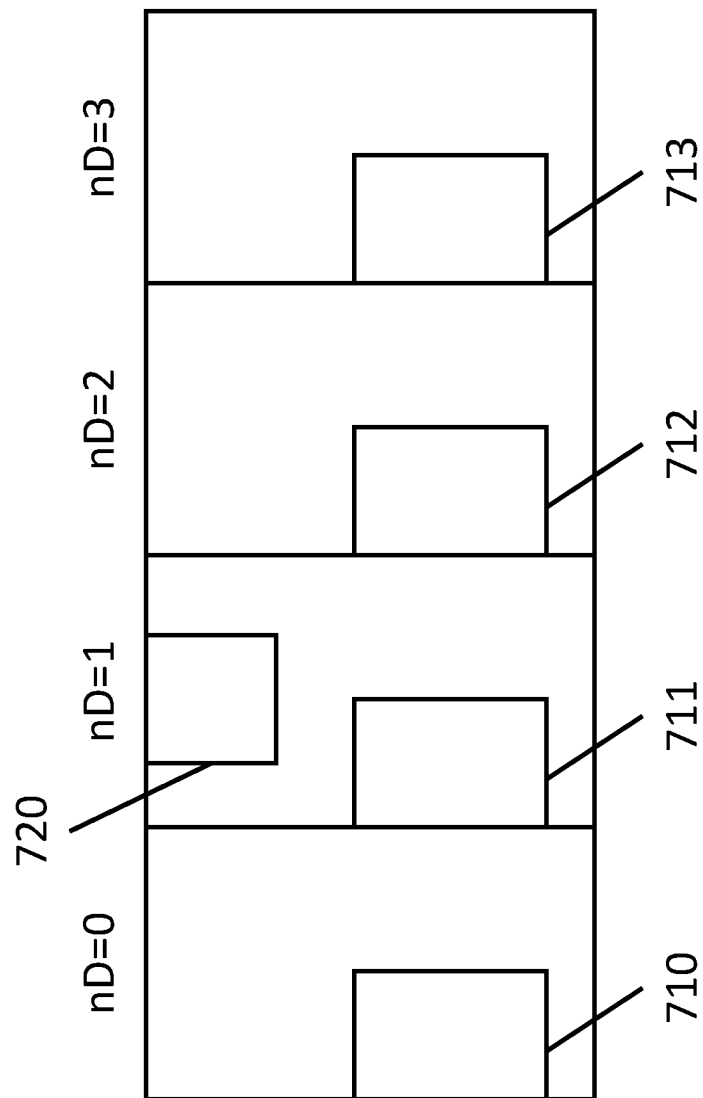
FIG. 7 is a schematic depiction of four consecutive slots having where a SPS PDSCH is scheduled with an aggregation factor of 4, and a SPS release DCI for the PDSCH is received during one of the slots.

FIG. 7 is a schematic depiction of four consecutive slots having where a SPS PDSCH is scheduled, and a SPS release DCI for the PDSCH is received in slot 1. In particular a SPS PDSCH is scheduled with an aggregation factor of 4 and therefore SPS PDSCH occasions 710, 711, 712, and 713 appear in consecutive slots (labeled nD=0, nD=1, nD=2, and nD=3). A release DCI PDCCH 720 is transmitted during slot nD=1 to release the SPS PDSCH occasions. The standard does not allow the arrangement shown in FIG. 7, because the end of the release DCI PDCCH 720 is after the end of the SPS PDSCH occasion 711 in the same slot.

Figure 8:
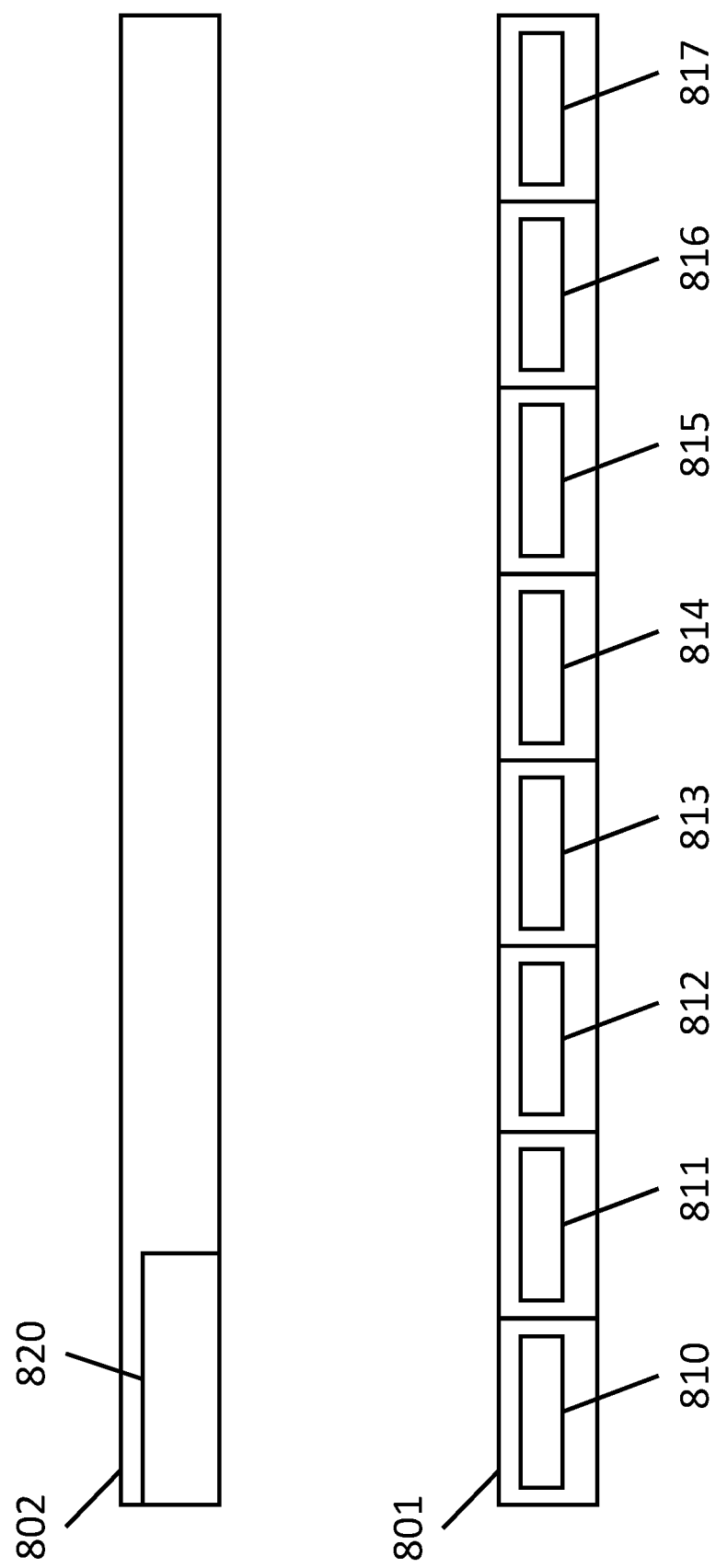
FIG. 8 depicts an example of release of a SPS PDSCH scheduled with an aggregation factor, where the release physical downlink control channel (PDCCH) is transmitted on a different cell than the PDSCH cell in an X-CC scheduling scenario.

FIG. 8 depicts an example of release of a SPS PDSCH scheduled with an aggregation factor, where the release PDCCH is transmitted on a different cell than the PDSCH cell in an X-CC scheduling scenario. In this case, if the numerology of scheduling cell is less than that of scheduled cell and the SPS PDSCH periodicity is small, e.g. one slot, it may be the case that one SPS PDSCH ends before the end of the release PDCCH while the next SPS PDSCH ends after the end of the PDCCH. In the particular example shown in FIG. 8, the scheduled cell 801 has a sub-carrier spacing (SCS) of 120 KHz with corresponding SPS PDSCH occasions 810, 811, 812, 813, 814, 815, 816, and 817 and the scheduling cell 802 has a SCS of 15 KHz with a release DCI PDCCH 820. Although the release DCI PDCCH 820 starts at the beginning of the scheduling cell 802, the first SPS PDSCH occasion 810 still ends before the end of the release DCI PDCCH 820, due in part to the difference in numerology of the scheduling cell 802 versus the scheduled cell 801.

Assuming that all the ACK/NACK of all of the SPS PDSCH and that of the release PDCCH is mapped to the same PUCCH, the scenario will not be supported according to the current standard if the "slot" (as the term is used in Release 16 of the 3GPP standard) refers to the PDCCH slot of the scheduled cell 801 (rather than a slot of the scheduling cell 802), while it may be a typical use case of X-CC scheduling with different numerologies. Similar scenario holds when the numerology of scheduling cell is larger than that of scheduled cell.

Accordingly, aspects of embodiments of the present disclosure relate to systems and methods for addressing at least the problems identified above: Problem A: PDSCH collision and release handling; Problem B: joint SPS PDSCH release handling; and Problem C: SPS PDSCH release with aggregation factor.

Systems and Methods for PDSCH Collision and Release Handling

As described above, Problem A relates to how the order in which physical downlink shared channel (PDSCH) collision resolution rules and PDSCH release rules are performed can sometimes cause different behavior.

Accordingly, some aspects of embodiments of the present disclosure relate to systems and methods for determining which PDSCH or PDSCHs are to be received in a slot in accordance with sequentially handling collisions between PDSCHs and handling commands to release PDSCHs, rather than making the determinations separately or concurrently (e.g., in parallel) or in circumstances where the order is undefined. For example, if the operations were performed concurrently with shared data structures (e.g., a shared set of Q SPS PDSCHs in a slot), a race condition may occur in which different PDSCHs may be selected to be received based on the timing by which the determinations were made. As another example, different implementations may cause these determinations to be made in different orders, thereby causing inconsistency or incompatibility in the determinations made by different devices, and thereby reducing the efficiency of communication between the devices.

Figure 9:
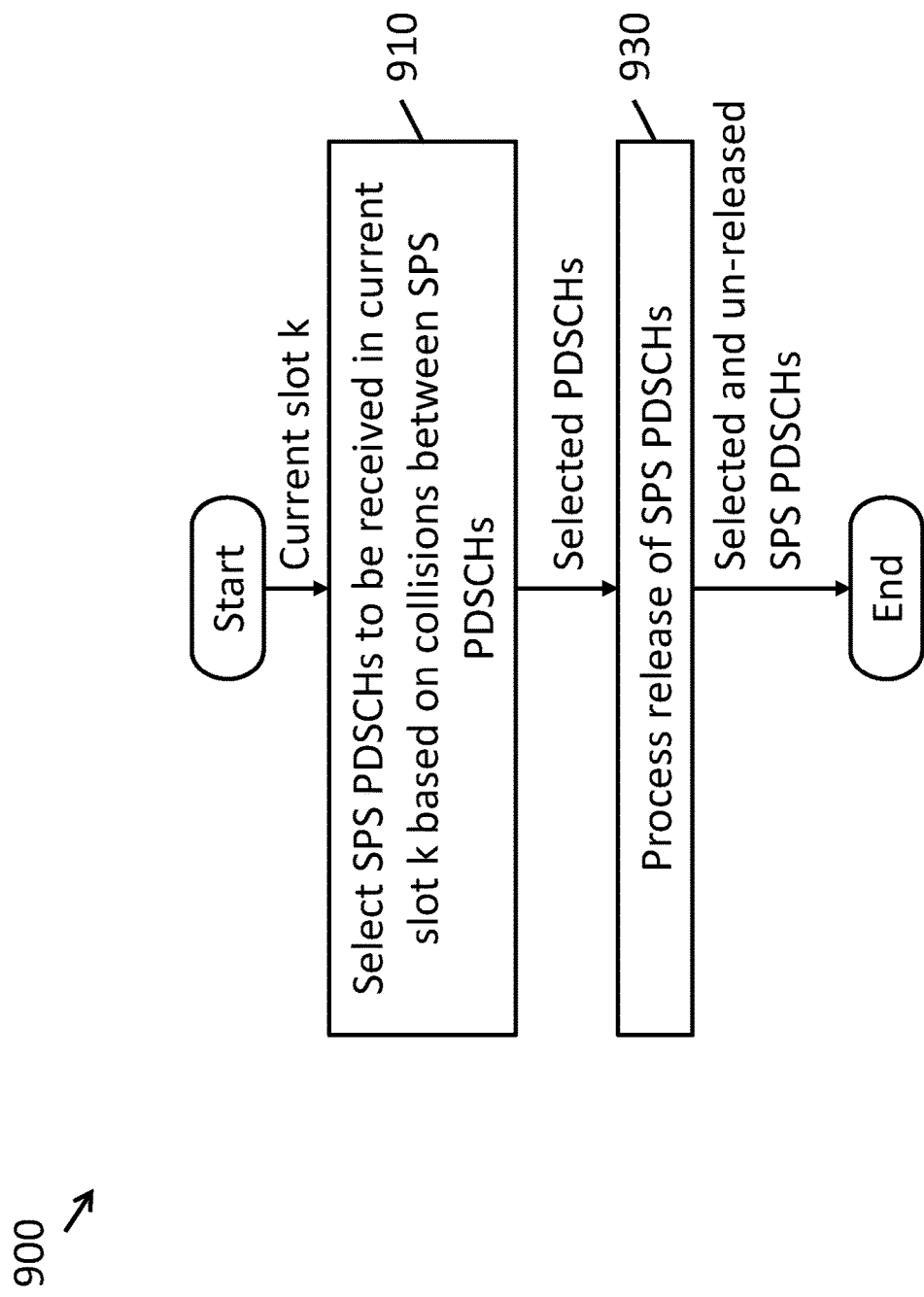
FIG. 9 is a flowchart depicting a method for handling collisions between PDSCHs and processing releases of SPS PDSCHs according to one embodiment of the present disclosure.

According to one embodiment of the present disclosure, SPS PDSCH collisions are handled before handling SPS PDSCH releases. FIG. 9 is a flowchart depicting a method 900 for handling collisions between PDSCHs and processing releases of SPS PDSCHs according to one embodiment of the present disclosure. As shown in FIG. 9, in operation 910 the PDSCH manager 200 selects SPS PDSCHs received in a current slot (e.g., slot k) based on resolving collisions between SPS PDSCHs. For example, as discussed above, in some embodiments, a UE receives the SPS PDSCH with the lowest configuration index within the set of SPS PDSCHs Q of the current slot, where the received SPS PDSCH is designated a surviving PDSCH and then removes, from Q, all SPS PDSCHs that overlap with the surviving PDSCH, and the process is repeated until Q is empty or the maximum number of PDSCHs (as set by the hardware constraints of the UE) have been selected to be received. In operation 930, the PDSCH manager 200 then processes any release DCI PDCCHs for releasing any of the SPS PDSCHs (e.g., a SPS PDSCH is not expected to be received if the end of the last symbol of the PDCCH is not after the end of the last symbol of the SPS PDSCH reception, and the ACK/NACK of the release PDCCH and the SPS PDSCH are mapped to the same PUCCH). If any of the selected PDSCHs determined in operation 910 are released, then those released SPS PDSCHs are removed from the selected PDSCHs, and the PDSCH manager 200 returns determines a set of selected and unreleased SPS PDSCHs to be received. Because the PDSCH manager 200 of the UE has information regarding all of the semi-static SPS PDSCH configurations via radio resource control (RRC), it is straightforward to resolve the SPS collisions in operation 910 prior to receiving any DCI that would affect the SPS PDSCH reception, as would be processed in operation 930.

Figure 10:
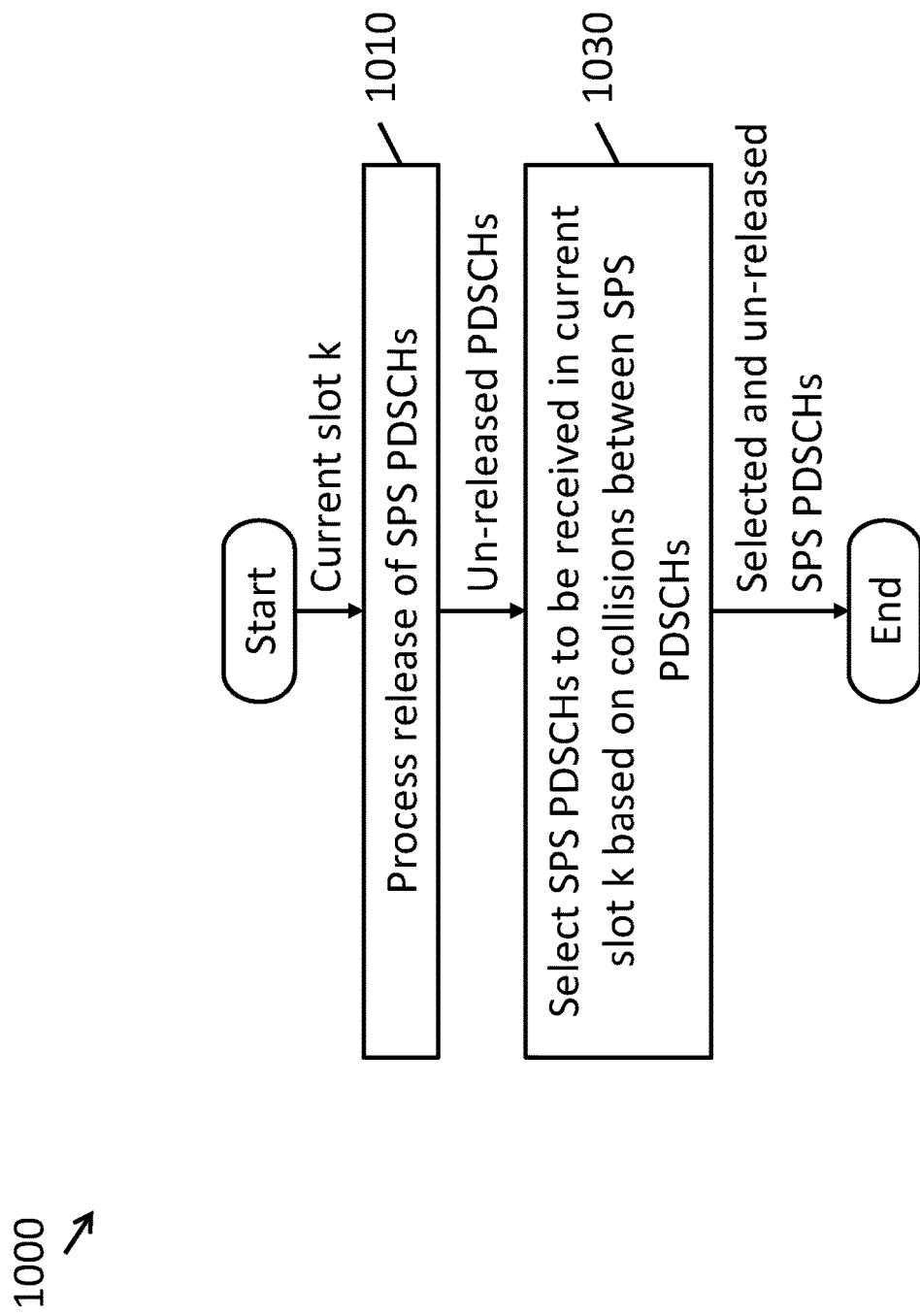
FIG. 10 is a flowchart depicting a method for processing releases of SPS PDSCHs and handling collisions between PDSCHs according to one embodiment of the present disclosure.

According to one embodiment of the present disclosure, SPS PDSCH releases are handled before handling SPS PDSCH collisions. FIG. 10 is a flowchart depicting a method 1000 for processing releases of SPS PDSCHs and handling collisions between PDSCHs according to one embodiment of the present disclosure. As shown in FIG. 10, in operation 1010, the PDSCH manager 200 processes any release DCI PDCCHs for releasing any of the SPS PDSCHs of the current slot k (e.g., a SPS PDSCH is not expected to be received if the end of the last symbol of the PDCCH is not after the end of the last symbol of the SPS PDSCH reception, and the ACK/NACK of the release PDCCH and the SPS PDSCH are mapped to the same PUCCH). Any such properly released SPS PDSCHs are then removed from the set Q of PDSCHs of the current slot k, leaving a set of un-released PDSCHs. In operation 1030, the PDSCH manager 200 applies a collision resolution process, as described above, to selected one or more PDSCHs from among the un-released PDSCHs to be received based on resolving collisions (e.g., selecting a SPS PDSCH with a lowest configuration index, designating that SPS PDSCH as a surviving PDSCH, and removing all PDSCHs that overlap with the surviving PDSCH, and repeating the process until Q is empty). Accordingly, in some embodiments of the present disclosure, the PDSCH manager 200 determines a set of selected and unreleased SPS PDSCHs to be received by first resolving the release of any SPS PDSCHs before resolving collisions between un-released SPS PDSCHs.

While some aspects of embodiments of the present disclosure are discussed above in reference to FIG. 9 and FIG. 10 from the perspective of a PDSCH manager 200 of a UE 10, embodiments of the present disclosure are not limited thereto and also include embodiments in which a PDSCH manager of a base station or gNB 20 performs a corresponding analysis of SPS collision and SPS release for a given UE 10 connected to the gNB 20 to determine which SPS PDSCHs will be received by a given UE 10. This enables the gNB 20 to, for example, transmit data to the connected UE 10 only in SPS PDSCHs that will be received by the UE 10, when SPS PDSCHs are selected and released and/or unreleased based on the embodiments of the present disclosure in accordance with FIG. 9 (where SPS PDSCH collision resolution is performed before processing release of SPS PDSCHs) or when SPS PDSCHs are selected and released and/or unreleased in accordance with embodiments of the present disclosure consistent with FIG. 10 (where the release of SPS PDSCHs is performed before performing SPS PDSCH collision resolution).

When determining PDSCHs to be received in a slot in accordance with the embodiments of FIG. 10 and when using a Type-1 HARQ-ACK codebook in accordance with Rel-16, the ACK/NACK of the release PDCCH takes the same location as that of an unreleased SPS PDSCH. As such, the unreleased SPS PDSCH is expected to be received, but its ACK/NACK cannot be reported in the same location as the release PDCCH. As one specific example, referring back to FIG. 5, when following the PDSCH selection process of FIG. 10, SPS config #0 is released and the UE is not expected to receive it. One ACK/NACK bit is generated for release DCI #0 in the location of the ACK/NACK for SPS PDSCH #0. SPS PDSCH #1 is expected to be received but since SPS config #0 510 and SPS config #1 511 are in the same Type-1 codebook subgroup (due to overlap of the SPS configs), there will be only one ACK/NACK bit available in the codebook for both PDSCHs.

Accordingly, some aspects of embodiments of the present disclosure relate to systems and methods for ACK/NACK determination in accordance with the embodiment of FIG. 10.

In some embodiments, it is an error case when: a) Type-1 HARQ-ACK codebook is configured and b) the ACK/NACK location of the release PDCCH and that of an unreleased SPS PDSCH whose ACK/NACK is mapped to the same PUCCH as the release PDCCH, are the same.

In some embodiments, in a case where: a) Type-1 HARQ-ACK CB is configured; and b) the ACK/NACK location of the release PDCCH and that of an unreleased SPS PDSCH whose ACK/NACK is mapped to the same PUCCH as the release PDCCH, are the same, then the PDSCH manager 200 generates a one bit ACK/NACK as the logical AND of the ACK/NACK of the release PDCCH and that of the unreleased PDSCH. In the specific example of FIG. 5, one ACK/NACK bit would be generated as the AND of the ACK/NACK of the SPS release DCI #0 520 and the ACK/NACK of SPS config #1 511.

In some embodiments, in a case where: a) Type-1 HARQ-ACK CB is configured; and b) the ACK/NACK location of the release PDCCH and that of an unreleased SPS PDSCH whose ACK/NACK is mapped to the same PUCCH as the release PDCCH, are the same, then PDSCH manager 200 performs SPS collision handling (as described above) to resolve the collision among the SPS PDSCHs and the released SPS PDSCH as if the released SPS PDSCH was not actually released. In the specific example of FIG. 5, PDSCH collision resolution is applied as if SPS config #0 510 was not actually released. In that case, SPS config #0 510 has the lowest configuration index and therefore SPS config #1 511 is removed and not expected to be received. As such, one ACK/NACK is generated for the SPS release DCI #0 PDCCH 520.

Systems and Methods for Joint SPS PDSCH Release Handling

As discussed above, Problem B relates to joint release of multiple SPS PDSCH occasions in circumstances where one of the SPS PDSCH occasions to be released ends before the end of the release PDCCH.

Accordingly, some aspects of embodiments of the present disclosure relate to systems and methods for handling joint release of multiple SPS PDSCH configurations.

Various embodiments will be described based on a reference slot to determine the UE behavior. The reference slot may be the PDCCH slot, PDSCH slot, or the slot with smallest SCS among the two. The PDCCH slot is defined as the slot on the scheduling cell in which the release PDCCH is transmitted. The PDSCH slot is defined as the slot on the scheduled cell in which the ending symbol of the release PDCCH ends (e.g., the slot overlapping with the end of the ending symbol, which may not be the same as the slot overlapping with the beginning of the ending symbol). The slot based on the smallest SCS configuration may be either the PDCCH slot or the PDSCH slot, depending on which has the smallest SCS (or they may be the same size).

In some embodiments of the present disclosure, the base station or gNB ensures that the SPS release PDCCH ends before at least one of the SPS PDSCHs that are indicated for release.

One embodiment of the present disclosure relates to a case where the release PDCCH ends before the end of at least one of the SPS PDSCHs in a corresponding PDSCH slot, where $\mu_{PDCCH} \leq \mu_{PDSCH}$ (where $\mu$ is the subcarrier spacing of the cells, e.g., $\mu_{PDCCH}$ is the SCS of the PDCCH and $\mu_{PDSCH}$ is the SCS of the PDSCH). In this embodiment, a SPS release PDCCH in a PDCCH slot indicates the release of SPS PDSCH configurations having indices $i_1, i_2, \ldots, i_N$, on the PDSCH cell such that: 1) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in the $2^{\mu_{PDSCH}-\mu_{PDCCH}}$ PDSCH slots within the PDCCH slot; 2) ACK/NACK of the release PDCCH and L SPS PDSCHs among the M PDSCHs (where L≤M) are mapped to the same PUCCH; and 3) the release PDCCH is received after the end of at least one of the SPS PDSCHs among the L SPS PDSCH receptions.

One embodiment of the present disclosure relates to a case where the release PDCCH ends before the end of at least one of the SPS PDSCHs in a corresponding PDSCH slot, where $\mu_{PDCCH} \geq \mu_{PDSCH}$. In this embodiment, a SPS release PDCCH in a PDCCH slot indicates the release of SPS PDSCH configurations indices $i_1, i_2, \ldots, i_N$, on the PDSCH cell such that: 1) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in the SPS PDSCH slot which contains the PDCCH slot; 2) ACK/NACK of the release PDCCH and L SPS PDSCHs among the M PDSCHs (where L≤M) are mapped to the same PUCCH; and 3) the release PDCCH is received after the end of at least one of the SPS PDSCHs among the L SPS PDSCH receptions.

According to some embodiments of the present disclosure, the network (e.g., a base station gNB) sends the SPS release PDCCH ahead of all the SPS PDSCHs in the largest slot among the PDCCH slot and the PDSCH slot. These embodiments is amenable to a simple UE implementation for processing of SPS PDSCHs and the ACK/NACK reporting.

One embodiment of the present disclosure relate to a case where the release PDCCH ends before the end of all SPS PDSCHs and where $\mu_{PDCCH} \leq \mu_{PDSCH}$ and where a smallest SCS slot is taken as a reference slot (in this case, because $\mu_{PDCCH} \leq \mu_{PDSCH}$, a PDSCH slot is taken as the reference slot). In this embodiment, it is not supported that a SPS release PDCCH in a PDCCH slot indicates the release of SPS PDSCH configurations indices $i_1, i_2, \ldots, i_N$, on the PDSCH cell such that 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the $2^{\mu_{PDSCH}-\mu_{PDCCH}}$ PDSCH slots within the PDCCH slot and 2) ACK/NACK of the release PDCCH and L≤M SPS PDSCHs among the M PDSCHs are mapped to the same PUCCH and 3) the release PDCCH is received after the end of any of the L SPS PDSCH receptions. In other words, this embodiment supports a case where, when 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the $2^{\mu_{PDSCH}-\mu_{PDCCH}}$ PDSCH slots within the PDCCH slot and 2) ACK/NACK of the release PDCCH and L≤M SPS PDSCHs among the M PDSCHs are mapped to the same PUCCH then 3) the release PDCCH must be received before the end of all L SPS PDSCH receptions.

One embodiment of the present disclosure relates to a case where a release PDCCH ends before the end of all SPS PDSCHs where the smallest SCS slot is taken as the reference slot $\mu_{PDCCH} \geq \mu_{PDSCH}$ (in this case, because $\mu_{PDCCH} > \mu_{PDSCH}$, a PDSCH slot is taken as the reference slot). In this embodiment, it is not supported that a SPS release PDCCH in a PDCCH slot indicates the release of SPS PDSCH configurations indices $i_1, i_2, \ldots, i_N$ on the PDSCH cell, such that 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the PDSCH slot containing the PDCCH slot and 2) ACK/NACK of the release PDCCH and L≤M SPS PDSCHs among the M PDSCHs are mapped to the same PUCCH and 3) the release PDCCH is received after the end of any of the L SPS PDSCH receptions. In other words, this embodiment supports a case where, when 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the PDSCH slot containing the PDCCH slot and 2) ACK/NACK of the release PDCCH and L≤M SPS PDSCHs among the M PDSCHs are mapped to the same PUCCH, then 3) the release PDCCH must be received before the end of all L SPS PDSCH receptions.

One embodiment of the present disclosure relates to a case where a release PDCCH ends before the end of all SPS PDSCHs, where a PDSCH slot is taken as the reference slot. In this embodiment, it is not supported that a SPS release PDCCH in a PDCCH slot indicates the release of SPS PDSCH configurations indices $i_1, i_2, \ldots, i_N$ on the PDSCH cell, such that: 1) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in the last PDSCH slot containing or overlapping with the end of the ending symbol of the PDCCH; 2) ACK/NACK of the release PDCCH and L SPS PDSCHs among the M PDSCHs (where L≤M) are mapped to the same PUCCH; and 3) the PDCCH is received after the end of any of the L SPS PDSCH receptions. In case where 1) and 2) hold but 3) does not, such as where the PDCCH is received before the end of all the L SPS PDSCHs, all the L SPS PDSCHs in the PDSCH slots are considered as released and all the indicated SPS PDSCHs in the previous PDSCH slots overlapping with the PDCCH slots are received. In other words, this embodiment supports a case where, when 1) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in the last PDSCH slot containing or overlapping with the end of the ending symbol of the PDCCH; 2) ACK/NACK of the release PDCCH and L SPS PDSCHs among the M PDSCHs (where L≤M) are mapped to the same PUCCH, then 3) the release PDCCH must be received before the end of all of the L SPS PDSCH receptions.

Figure 11:
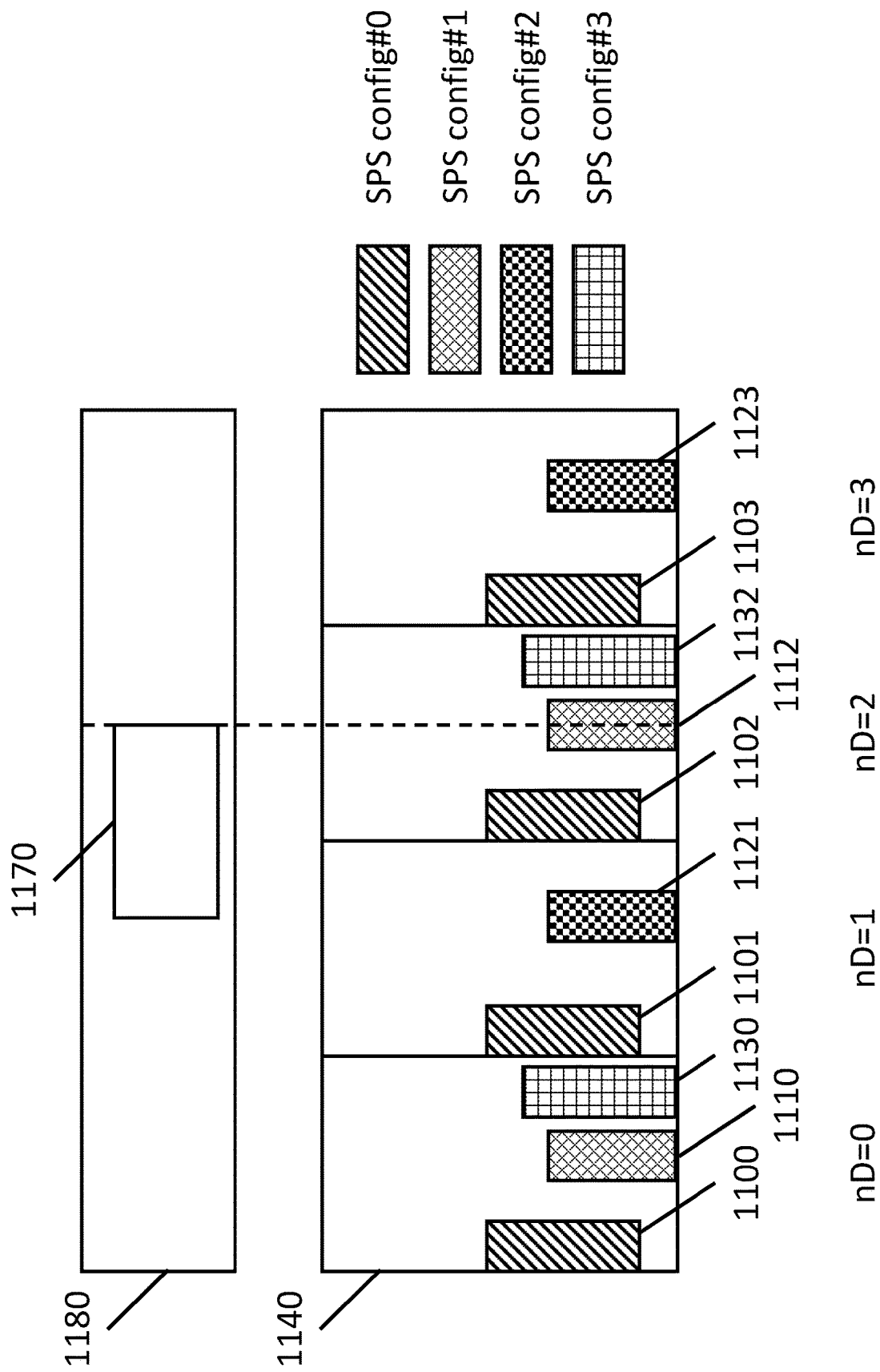
FIG. 11 is a schematic diagram depicting a joint release of multiple active SPS PDSCH configurations in a scheduled cell by a release DCI in a scheduling cell according to one embodiment of the present disclosure.

FIG. 11 is a schematic diagram depicting a joint release of multiple active SPS PDSCH configurations in a scheduled cell by a release DCI in a scheduling cell. In the example of FIG. 11, four consecutive slots (labeled nD=0, nD=1, nD=2, and nD=3) of a scheduled cell 1140 include occasions of four different SPS PDSCH configurations, labeled SPS config #0, SPS config #1, SPS config #2, and SPS config #3. SPS config #0 has PDSCH occasions 1100, 1101, 1102, and 1103 in slots nD=0, nD=1, nD=2, and nD=3, respectively. SPS config #1 has SPS PDSCH occasions 1110 and 1112 in slots nD=0 and nD=2, respectively. SPS config #2 has SPS PDSCH occasions 1121 and 1123 in slots nD=1 and nD=3, respectively. SPS config #3 has SPS PDSCH occasions 1130 and 1132 in slots nD=0 and nD=2, respectively. A release DCI 1170 appears in the scheduling cell 1180, where the length of one slot of the scheduling cell is longer than the length of a slot in the scheduled cell (in other words, the subcarrier spacing of the scheduling cell is lower than the subcarrier spacing of the scheduled cell, for example, the subcarrier spacing of the scheduling cell may be 15 kHz and the subcarrier spacing of the scheduled cell may be 120 kHz). The PDCCH of the release DCI 1170 begins during slot nD=1 of the scheduled cell 1140 and ends (e.g., the last symbol of the release DCI 1170 ends) during slot nD=2 of the scheduled cell 1140 (in particular, during the SPS config #1 occasion 1112). In this example, it is assumed that the release PDCCH or Release DCI 1170 indicates the release of N=3 SPS PDSCH configurations with configuration indices {0, 1, 2}. It is assumed in this example that the ACK/NACK of the indicated SPS PDSCHs are mapped to the same PUCCH as the release PDCCH, and the SPS PDSCHs are released according to the embodiment described immediately above. In particular, none of the SPS PDSCHs 1100, 1110, 1130 in slot nD=0 and SPS PDSCHs 1101 and 1121 in slot nD=1 are considered to be released. One ACK/NACK bit for each of these SPS PDSCHs is generated. In slot nD=2, only SPS PDSCH with configuration index #1 (SPS PDSCH 1112) is considered to be released (SPS PDSCH 1132 of SPS config #3 is not released because the release DCI 1170 is assumed to only identify configuration indices 0, 1, and 2), and in slot nD=3, SPS PDSCHs with configuration indices 0 and 2 (SPS PDSCHs 1103 and 1123) are considered to be released. The UE is not expected to receive SPS PDSCHs which are considered to be released, and a 1 bit ACK/NACK is generated for the set of released SPS PDSCHs and the release PDCCH.

Figure 12A:
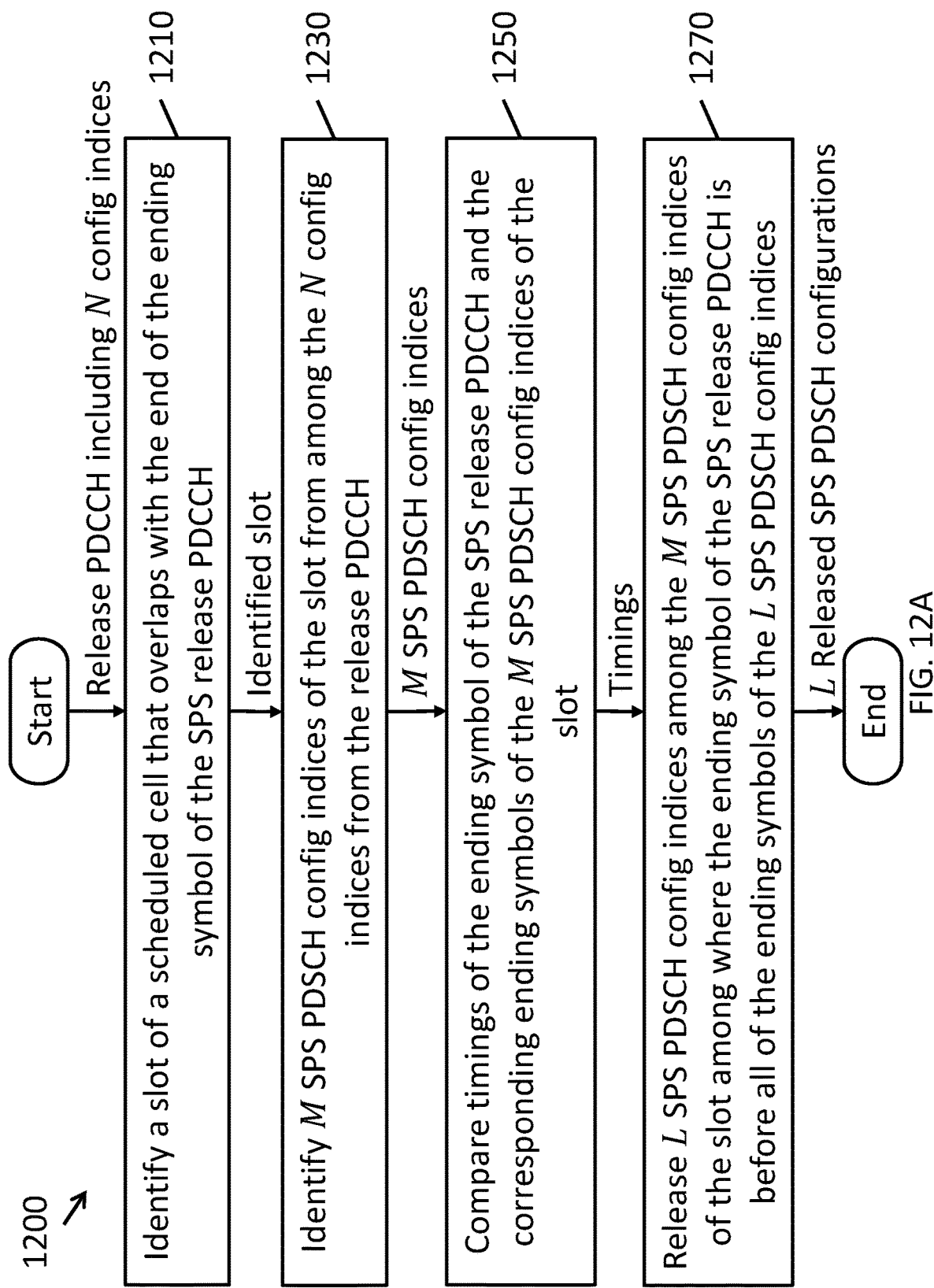
FIG. 12A is a flowchart of a method for jointly releasing multiple SPS PDSCH configurations according to one embodiment of the present disclosure.

FIG. 12A is a flowchart of a method 1200 for jointly releasing multiple SPS PDSCH configurations according to one embodiment of the present disclosure. Referring to FIG. 12A, the PDSCH manager 200 may receive information regarding a SPS release PDCCH in a scheduling cell, where the SPS release PDCCH identifies N SPS PDSCH configuration indices $i_1, \ldots, i_N$. In operation 1210 the PDSCH manager 200 identifies a slot of a scheduled cell, where the slot of scheduled cell overlaps with the end of the ending symbol of the SPS release PDCCH. In operation 1230, the PDSCH manager 200 identifies M SPS PDSCH configuration indices $j_1, \ldots, j_M$ including all configuration indices from among the N SPS PDSCH configuration indices that are configured in the slot, where M≤N. Each of the M SPS PDSCH configuration indices being associated with corresponding ending symbols having particular timings at which their corresponding PDSCH occasions start and end within the slot (e.g., timings of the starting and ending symbols). In operation 1250, the PDSCH manager 200 compares the timing of the end of the ending symbol of the SPS release PDCCH and the timings of the ends of the ending symbols of the PDSCH occasions associated with the M SPS PDSCH configuration indices. In operation 1270, the PDSCH manager 200 determines that it is appropriate to release all M SPS PDSCH configurations when it determines that the end of the ending symbol of the SPS release PDCCH is before the ends of the ending symbols of each of the PDSCH occasions associated with the M SPS PDSCH configuration indices.

Figure 12B:
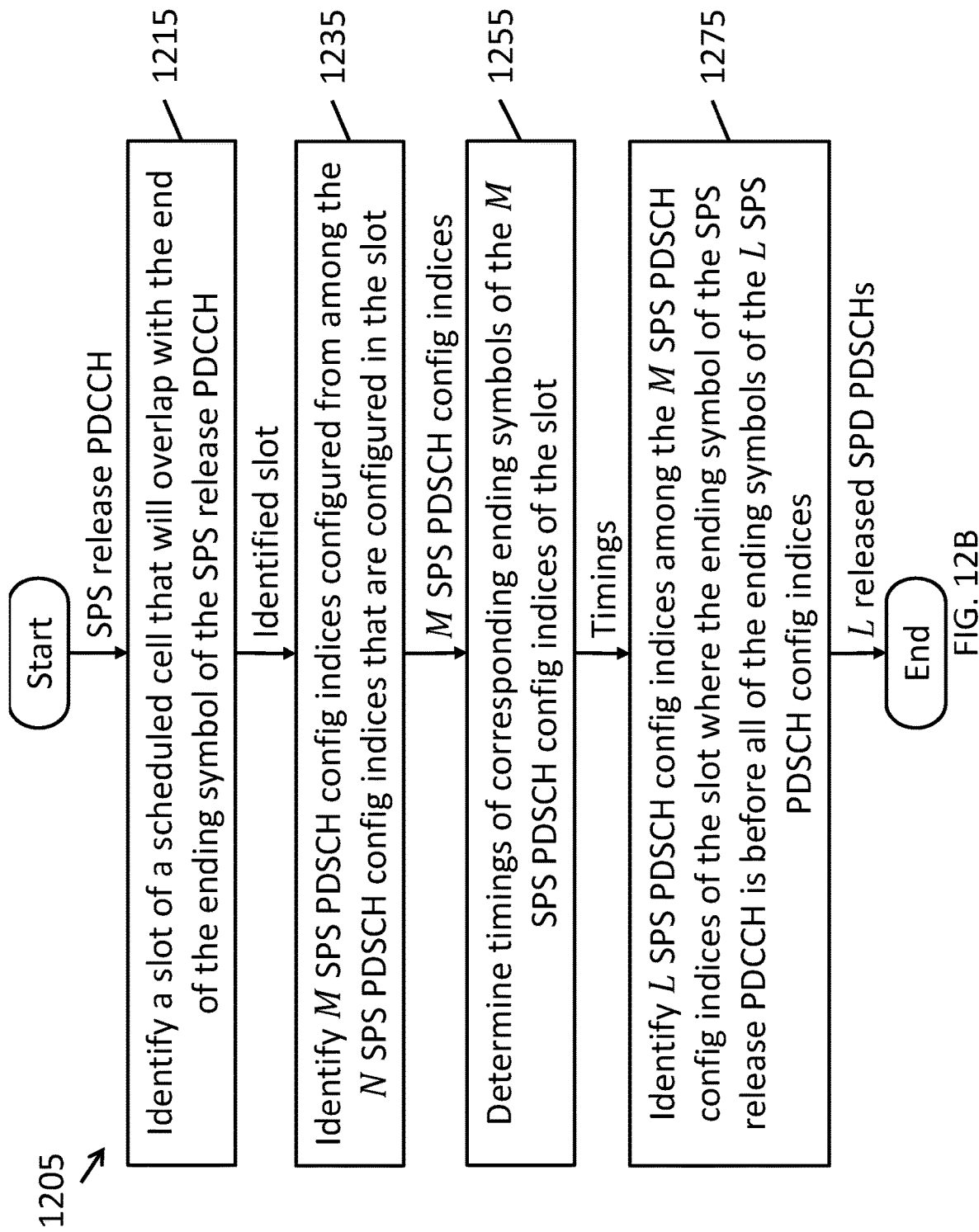
FIG. 12B is a flowchart of a method for determining which SPS PDSCH occasions will be received by a UE when processing a SPS release PDCCH for jointly releasing multiple SPS PDSCH configurations according to one embodiment of the present disclosure.

FIG. 12B is a flowchart of a method 1205 for determining which SPS PDSCH occasions will be received by a UE when processing a SPS release PDCCH for jointly releasing multiple SPS PDSCH configurations according to one embodiment of the present disclosure. In more detail, in some embodiments of the present disclosure the gNB 20 generates a SPS release PDCCH for N SPS PDSCH configurations and transmits the generated SPS release PDCCH to control the behavior of a UE 10, such as by causing the UE 10 to release particular SPS PDSCHs identified in the SPS release PDCCH and to control the reception of SPS PDSCHs by the UE 10. The gNB 20 may also transmit data to the UE 10 via one or more SPS PDSCHs, where the gNB 20 uses the determination of which SPS PDSCHs will be received to determine which SPS PDSCHs to use for transmitting the data. Referring to FIG. 12B, in the gNB 20 may initially determine an approximate timing for the SPS release PDCCH, such as determining, in operation 1215, which slot or slots of a scheduled cell 1140 will overlap with the end of the ending symbol of the SPS Release PDCCH 1170. In operation 1235 the gNB 20 identifies M SPS PDSCH config indices of SPS PDSCHs that are configured to occur in the identified slot. In operation 1255, the gNB 20 determines the timings of the end of the ending symbol of the M SPS PDSCH configuration indices of the slot. In operation 1275, the gNB 20 generates a SPS Release PDCCH with N SPS PDSCH configuration indices, where the N SPS PDSCH configuration indices and the timing of the SPS Release PDCCH are set based on ensuring that the last symbol of the SPS Release PDCCH occurs before the ends of the ending symbols of each of the N SPS PDSCHs corresponding to the N SPS PDSCH configuration indices listed in the SPS Release PDCCH.

One embodiment of the present disclosure relates to a case where the release PDCCH ends before the end of all SPS PDSCHs; PDCCH slot). In this embodiment, it is not supported that a SPS release PDCCH in a PDCCH slot indicates the release of SPS PDSCH configurations indices $i_1, i_2, \ldots, i_N$ on the PDSCH cell, such that 1) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in any of the PDSCH slots which overlap with the PDCCH slot; 2) ACK/NACK of the release PDCCH and L≥1 SPS PDSCHs among the M PDSCHs (where L≤M) are mapped to the same PUCCH; and 3) the PDCCH is received after the end of any of the L SPS PDSCH receptions. In other words, some embodiments relate to a case where it is supported that a SPS release PDCCH in a PDCCH slot indicates the release of SPS PDSCH configurations indices $i_1, i_2, \ldots, i_N$ on the PDSCH cell, such that 1) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in any of the PDSCH slots which overlap with the PDCCH slot; 2) ACK/NACK of the release PDCCH and L≥1 SPS PDSCHs among the M PDSCHs (where L≤M) are mapped to the same PUCCH; and 3) the PDCCH is received before the end of all of the L SPS PDSCH receptions.

Some aspects of embodiments of the present disclosure relate to less restrictive approaches to handling joint releases of SPS PDSCH configurations, such as by determining which indicated SPS PDSCHs are actually released and which ones are expected to be received by UE in spite of being indicted as released.

One embodiment of the present disclosure relates to a case where only SPS PDSCHs which end after the end of the release PDCCH are released, where $\mu_{PDCCH} \leq \mu_{PDSCH}$; and a smallest SCS slot is taken as the reference slot (in this case, because $\mu_{PDCCH} \leq \mu_{PDSCH}$, a PDCCH slot is taken as the reference slot). In this embodiment, it is supported to receive a SPS release PDCCH in a PDCCH slot indicating the release of SPS PDSCH configurations indices $i_1, i_2, \ldots, i_N$ (N≥1) on the SPS PDSCH cell such that: 1) the SCS numerology of the release PDCCH is smaller than or equal to that of the SPS PDSCH cell; 2) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in the $2^{\mu_{PDSCH}-\mu_{PDCCH}}$ SPS PDSCH slots within the PDCCH slot; and 3) ACK/NACK of the release PDCCH and L SPS PDSCHs are mapped to the same PUCCH (where L≤M). In this case, the SPS release PDCCH is only applicable to R SPS PDSCHs (where R≤L) for which the end of the ending symbol of the PDSCH is not before the end of the ending symbol of release PDCCH. These SPS PDSCHs are considered as released and the UE is not expected to receive them within the PDCCH slot. A 1 bit ACK/NACK is generated for the SPS release PDCCH and the R released SPS PDSCHs.

One embodiment of the present disclosure relates to a case where only SPS PDSCHs which end after the end of the release PDCCH are released $\mu_{PDCCH} \geq \mu_{PDSCH}$; and a smallest SCS slot is taken as the reference slot (in this case, because $\mu_{PDCCH} \geq \mu_{PDSCH}$, a PDSCH slot is taken as the reference slot). In this embodiment, it is supported to receive a SPS release PDCCH in a PDCCH slot indicating the release of SPS PDSCH configurations indices $i_1, i_2, \ldots, i_N$ (N≥1) on the SPS PDSCH cell such that: 1) the SCS numerology of the release PDCCH is greater than or equal to that of the SPS PDSCH cell; 2) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in the SPS PDSCH slots which contains the PDCCH slot; and 3) ACK/NACK of the release PDCCH and L≤M SPS PDSCHs are mapped to the same PUCCH. In this case, the SPS release PDCCH is only applicable to R SPS PDSCHs (where R≤L) for which the end of the ending symbol of the PDSCH is not before the end of the ending symbol of release PDCCH. These SPS PDSCHs are considered as released and the UE is not expected to receive them within the PDCCH slot. One bit ACK/NACK is generated for the SPS release PDCCH and the R released SPS PDSCHs.

Figure 13:
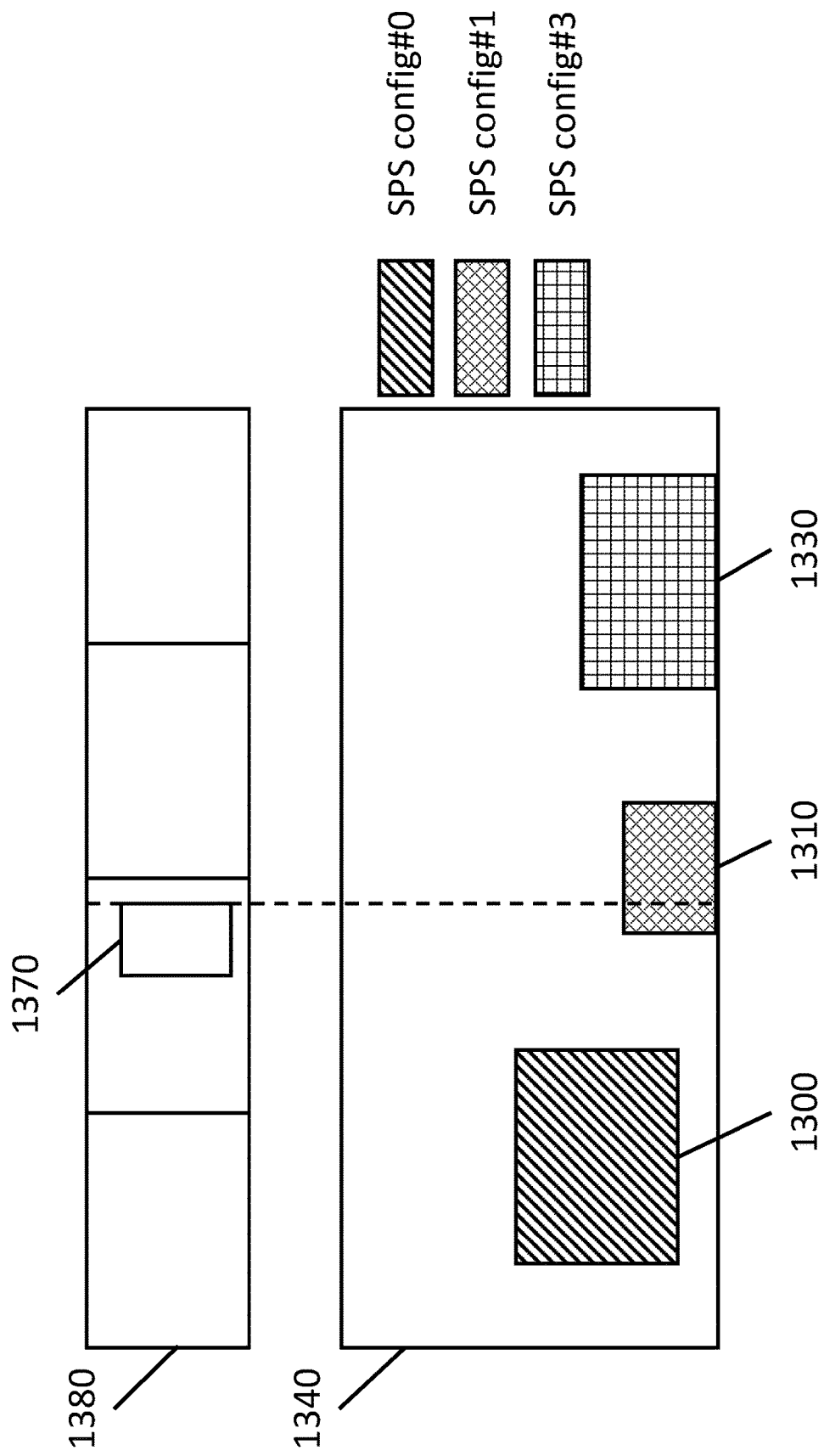
FIG. 13 is an example of a release DCI PDCCH indicating the release of SPS PDSCH configurations according to one embodiment of the present disclosure.

FIG. 13 is an example of a release DCI PDCCH indicating the release of SPS PDSCH configurations. In the example shown in FIG. 13, the release PDCCH 1370 in scheduling cell 1380 indicates the release of SPS configuration indices 0 and 1 (shown as PDSCH occasions 1300 and 1310) in scheduled cell 1340. In the example shown in FIG. 13, the scheduling cell 1380 has a shorter slot than the scheduled cell 1340 (in other words, the subcarrier spacing of the scheduling cell is higher than the subcarrier spacing of the scheduled cell, for example, the scheduling cell may have a subcarrier spacing of 60 kHz and the scheduled cell may have a subcarrier spacing of 15 kHz). Assuming the same PUCCH resource for ACK/NACK of the release PDCCH 1370 and the indicated SPS PDSCHs 1300 and 1310, only SPS PDSCH #1 1310 is considered to be released (because the last symbol of the release PDCCH 1370 was not before the end of SPS PDSCH #0 1300) and the UE is not expected to receive it (e.g., in some embodiments, the gNB 20 generates release PDCCHs that do not include, or never include, SPS PDSCHs that end before the last symbol of the release PDSCH when the A/N of the PDCCH and the released PDSCHs would map to the same PUCCH slot). One bit ACK/NACK is generated for the set of released SPS PDSCH #1 1310 and the release PDCCH 1370. The ACK/NACK generation for the remaining SPS PDSCHs is unaltered by the release PDCCH.

One embodiment of the present disclosure relates to a case where only SPS PDSCHs which end after the end of the release PDCCH are released, based on a reference PDSCH slot. In this embodiment, it is supported to receive a SPS release PDCCH in a PDCCH slot indicating the release of SPS PDSCH configurations indices $i_1, i_2, \ldots, i_N$ (N≥1) on the SPS PDSCH cell such that 1) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in the PDSCH slot where the PDSCH slot is the PDSCH slot which contains or overlaps with the end of the ending symbol of the PDCCH and 2) ACK/NACK of the release PDCCH and L SPS PDSCHs are mapped to the same PUCCH (where L≤M). In this case, the SPS release PDCCH is only applicable to R SPS PDSCHs for which the end of the ending symbol of the PDSCH is not before the end of the ending symbol of release PDCCH (where R≤L). These SPS PDSCHs are considered as released and UE is not expected to receive them within the PDSCH slot (e.g., the gNB 20 does not transmit data on the SPS PDSCHs that are considered to be released). A 1 bit ACK/NACK is generated for the SPS release PDCCH and the R released SPS PDSCHs. The UE is expected to receive the SPS PDSCHs whose ending symbol ends before the ending symbol of the release PDCCH.

One embodiment of the present disclosure relates to a case where Only SPS PDSCHs which end after the end of the release PDCCH are released, and a PDCCH slot is taken as the reference slot. In this embodiment, it is supported to receive a SPS release PDCCH in a PDCCH slot indicating the release of SPS PDSCH configurations indices $i_1, i_2, \ldots, i_N$ (N≥1) on the SPS PDSCH cell such that 1) M SPS PDSCH configuration indices $j_1, j_2, \ldots, j_M$ (where M≤N and $\{j_1, j_2, \ldots, j_M\} \subseteq \{i_1, i_2, \ldots, i_N\}$) are configured to be received in all of the PDSCH slots which overlap with the PDCCH slot and 2) ACK/NACK of the release PDCCH and the L SPS PDSCHs are mapped to the same PUCCH (where L≤M). In this case, the SPS release PDCCH is only applicable to R SPS PDSCHs for which the end of the ending symbol of the PDSCH is not before the end of the ending symbol of release PDCCH (where R≤L). These SPS PDSCHs are considered as released and UE is not expected to receive them within the PDSCH slots (e.g., the gNB 20 does not transmit data on the SPS PDSCHs that are considered to be released). A 1 bit ACK/NACK is generated for the SPS release PDCCH and the R released SPS PDSCHs. The UE is expected to receive the SPS PDSCHs whose ending symbol ends before the end of the ending symbol of the release PDCCH.

In the above embodiments, the PDSCH manager 200 of the UE determines which indicated SPS PDSCHs are actually released and which ones are expected to be received by UE in spite of being indicted as released. Some aspects of embodiments of the present disclosure relate to providing a location for reporting ACK/NACK of SPS PDSCHs in these circumstances where a SPS PDSCH is received even though they were released.

One embodiment of the present disclosure relates to an error case indicating that an ACK/NACK location is unavailable. In more detail, when a Type-1 HARQ-ACK codebook is configured, in the above embodiments, the PDSCH manager 200 expects that there is one ACK/NACK bit location available for the SPS PDCCH release and the actually released SPS PDSCHs (the R SPS PDSCHs) and there are ACK/NACK bit locations available for each of the remaining received SPS PDSCHs. If this is not the case, embodiments of the present disclosure relate to providing an error case indicating this condition.

One embodiment of the present disclosure relates to modifying ACK/NACK behavior to ignore SPS PDSCH configuration indices in the PDCCH that are not actually released. When Type-1 HARQ-ACK codebook is configured, for the purpose of determination of ACK/NACK bits for the release PDCCH, the PDSCH manager 200 of the UE assumes that only SPS configuration indices of the actually released SPS PDSCHs (the R SPS PDSCHs) are present in the release PDCCH. The location of ACK/NACK of the release PDCCH and the R released PDSCHs is determined from the start and length indicator value (SLIV) of the SPS PDSCH with the lowest configuration index among the R SPS PDSCHs. The ACK/NACK locations for the remaining SPS PDSCHs are determined assuming they are received. Any of the remaining SPS PDSCH whose SLIV is in the same Type-1 CB subgroup as that of the release PDCCH is determined by the PDSCH manager 200 as not received by the UE, and no ACK/NACK bit is generated for such SPS PDSCHs.

Systems and Methods for SPS PDSCH Release with Aggregation Factor

As discussed above, Problem C relates to handling release of SPS PDSCHs that are configured with an aggregation factor. Some aspects of embodiments of the present disclosure relate to supporting a case where the release PDCCH ends after the end of a SPS PDSCH occasion within the repetition of the SPS PDSCH in accordance with its aggregation factor. In some embodiments, the end of the ending symbol of the release PDCCH may be after the end of the ending symbol of the SPS PDSCH in the same slot and still release the SPS PDSCH, so long as the SPS PDSCH occasion is not the last repetition due to the aggregation factor.

One embodiment of the present disclosure relates to a case where the last SPS PDSCH occasion among the SPS PDSCH with repetition is considered to determine whether the release PDCCH can release the SPS PDSCHs). In more detail, if the SPS PDSCH configurations indicated by the release PDCCH are configured with an aggregation factor (AF) greater than or equal to 1, for the purposes of determining release behavior, a SPS PDSCH configuration with AF≥1 is only considered as configured to be received in the last slot among the J≤AF slots. In other words, the SPS PDSCH with configuration AF≥1 can by released by a PDCCH that ends at any time before the last symbol of the last slot of the SPS PDSCH configuration with AF≥1. In case of semi-static time division duplex uplink/downlink (TDD UL/DL) configuration, J slots are determined as the slots among the AF slots in which the SPS PDSCH occasion does not overlap with any uplink (UL) symbol. Embodiments of the present disclosure relating to addressing Problem B can also be applied to the X-CC scenario as well as to single release in accordance with the case of N=1 (e.g., only one SPS PDSCH configuration identified in the release PDCCH).

Some aspects of embodiments of the present disclosure relate to the particular case of a single SPS release and a SPS PDSCH with aggregation factor. In one embodiment, it is supported that a release PDCCH is received in a PDCCH slot indicating the release of a SPS PDSCH configured with an aggregation factor AF≥1 on the PDSCH cell such that: 1) at least for one occasion among J≤AF occasions of the SPS PDSCH, the end of a last symbol of the PDCCH reception is not after the end of a last symbol of the SPS PDSCH occasion reception where the J occasions are determined after resolving conflict with TDD UL/DL configuration and 2) the ACK/NACK of the SPS PDCCH release and the ACK/NACK of the SPS PDSCH would be mapped to the same PUCCH. In this case, the SPS PDSCH is considered as released, and a 1 bit A/N is generated for the SPS release PDCCH and the SPS PDSCHs.

Figure 14:
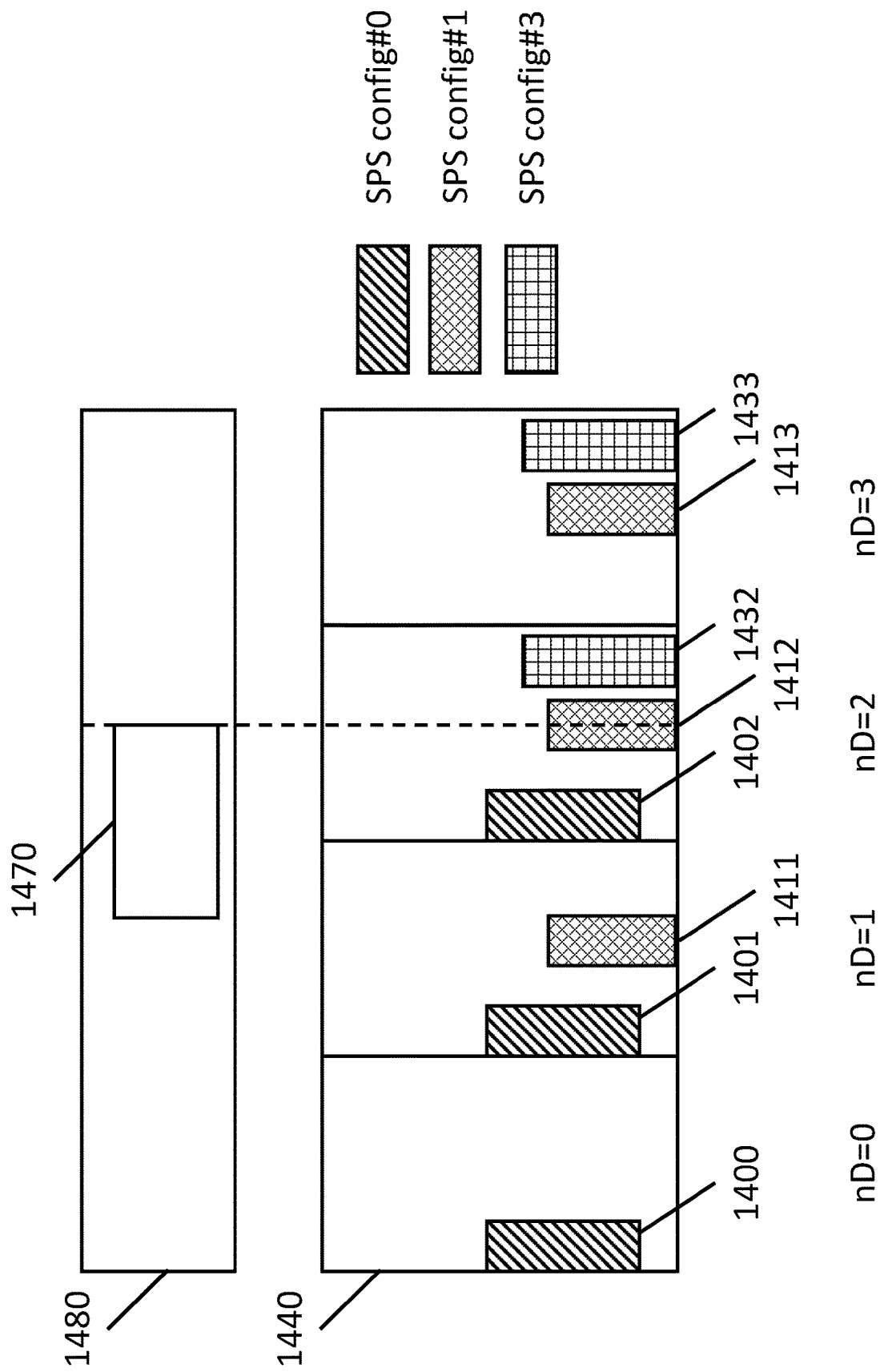
FIG. 14 is a schematic diagram depicting a joint release of multiple active SPS PDSCH configurations with aggregation factors in a scheduled cell by a release DCI in a scheduling cell according to one embodiment of the present disclosure.

FIG. 14 is a schematic diagram depicting a joint release of multiple active SPS PDSCH configurations with aggregation factors in a scheduled cell by a release DCI in a scheduling cell. In the example shown in FIG. 14, a release PDCCH 1470 (in scheduling cell 1480) indicates the release of SPS PDSCH configuration indices #0, #1 and #3. In this example, it is assumed that SPS configurations with indices 0, 1 and 3 are configured with aggregation factors of 4, 3 and 2, respectively. In particular, FIG. 14 shows the last three repetitions of SPS config #0 1400, 1401, and 1402 in slots nD=0, nD=1, and nD=2, respectively (the first repetition of SPS config #0 is not shown). The three repetitions of SPS config #1 1411, 1412, and 1413 are shown in slots nD=1, nD=2, and nD=3, respectively. The two repetitions of SPS config #3 are shown in slots nD=2 and nD=3, respectively. According to the above method, because the last symbol of the release PDCCH 1470 falls in slot nD=2, it is before the last repetition of both SPS config #1 and SPS config #3 (e.g., repetitions 1413 and 1433, respectively) and therefore these configurations are released. However, the last symbol falls after the last repetition of SPS config #0 (repetition 1402), and therefore SPS config #0 is not released.

Figure 15A:
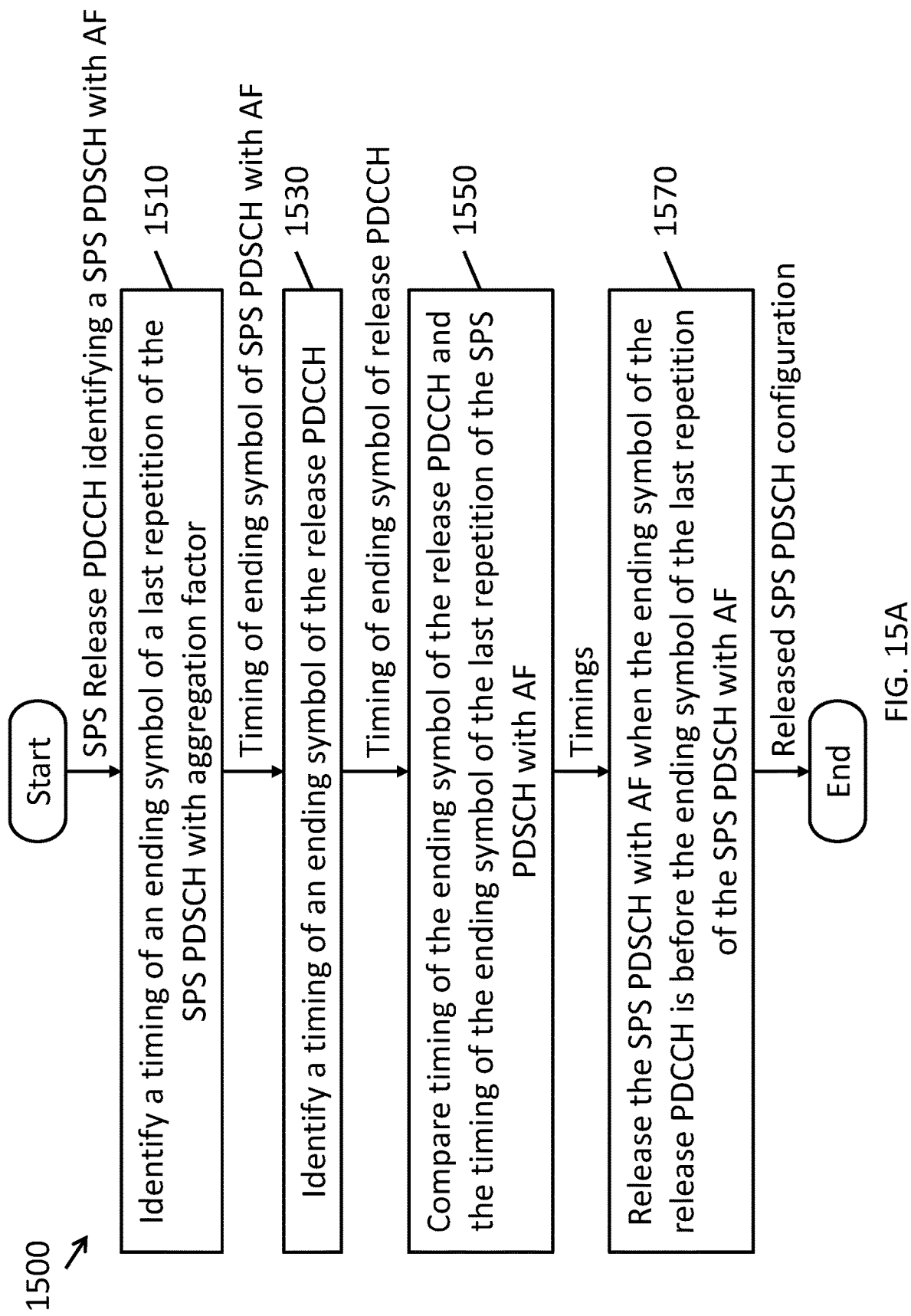
FIG. 15A is a flowchart of a method for releasing a SPS PDSCH configuration with an aggregation factor according to one embodiment of the present disclosure.

FIG. 15A is a flowchart of a method 1500 for releasing a SPS PDSCH configuration with an aggregation factor according to one embodiment of the present disclosure. As shown in FIG. 15A, a PDSCH manager 200 receives a release PDCCH identifying a SPS PDSCH configured with an aggregation factor. In operation 1510, the PDSCH manager 200 identifies a timing of an ending symbol of a last repetition of the SPS PDSCH with aggregation factor. In operation 1530, the PDSCH manager 200 identifies a timing of an ending symbol of the release PDCCH. In operation 1550, the PDSCH manager 200 compares the timing of the end of the ending symbol of the release PDCCH and the timing of the end of the ending symbol of the last repetition of the SPS PDSCH with aggregation factor, and in operation 1570, the PDSCH manager 200 releases the SPS PDSCH configured with aggregation factor if the end of the ending symbol of the release PDCCH is before the end of the ending symbol of the last repetition of the SPS PDSCH with aggregation factor.

Figure 15B:
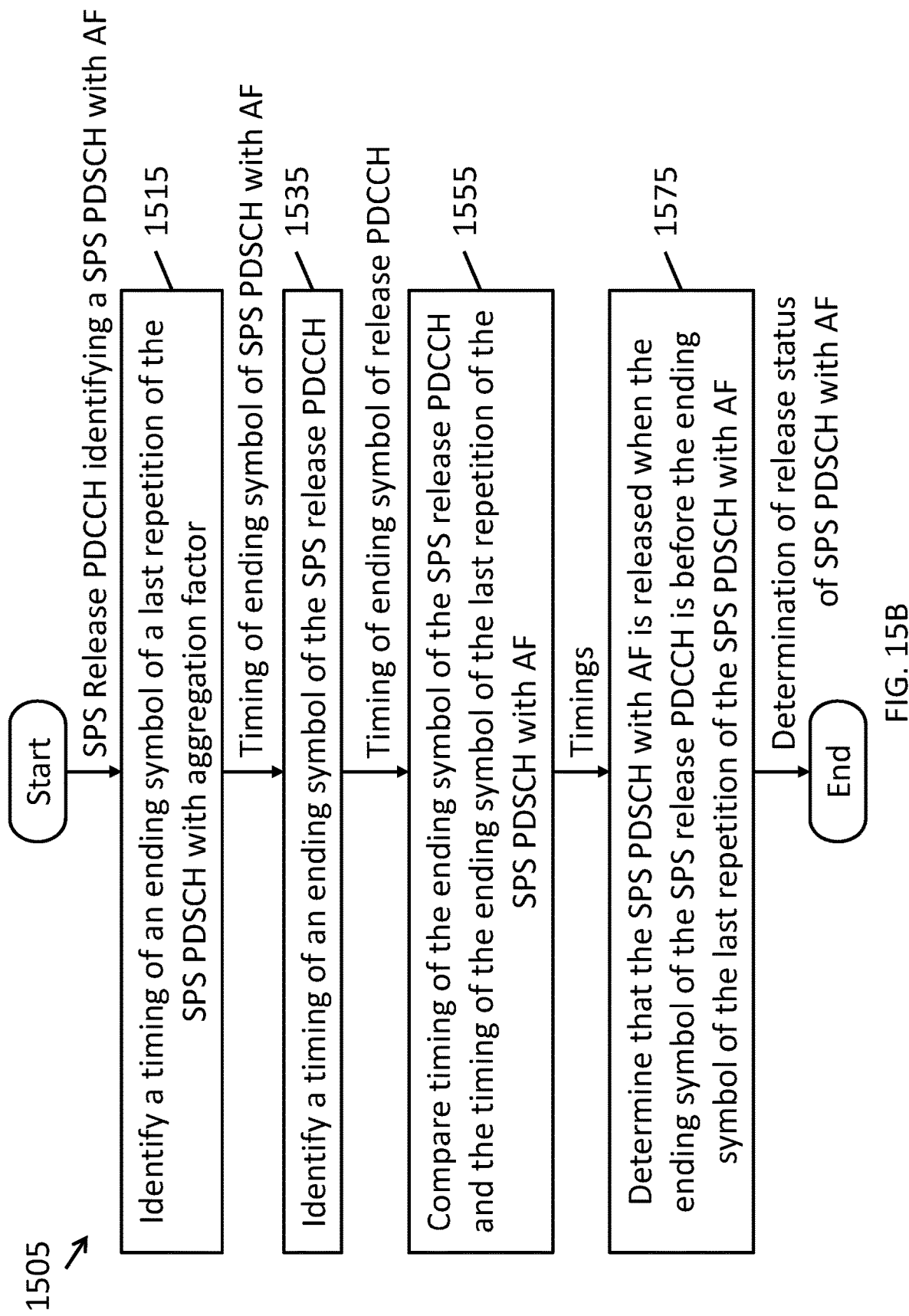
FIG. 15B is a flowchart of a method for determining whether a SPS PDSCH with an aggregation factor will be received by a UE when processing a SPS release PDCCH according to one embodiment of the present disclosure.

FIG. 15B is a flowchart of a method 1505 for determining whether a SPS PDSCH with an aggregation factor will be received by a UE when processing a SPS release PDCCH according to one embodiment of the present disclosure. In more detail, in some embodiments of the present disclosure the gNB generates a SPS release PDCCH to release a SPS PDSCH configuration with aggregation factor in accordance with the embodiment described above with respect to FIG. 15A, and transmits the generated SPS release PDCCH to control the behavior of a UE 10, such as by causing the UE 10 to release the SPS PDSCH with aggregation factor identified in the SPS release PDCCH and to control the reception of SPS PDSCHs by the UE 10. Referring to FIG. 15B, in operation 1515, the gNB 20 identifies a timing of an ending symbol of a last repetition of the SPS PDSCH with aggregation factor that is to be released. In operation 1535, the gNB 20 identifies a timing of the end of the ending symbol of the SPS release PDCCH. In operation 1555, the gNB 20 compares the timing of the end of the ending symbol of the release PDCCH with the timing of the end of the ending symbol of the last repetition of the SPS PDSCH with aggregation factor. In operation 1575, the gNB 20 determines that the SPS PDSCH with AF is released in circumstances where the end of the ending symbol of the SPS release PDCCH is before the end of the ending of the last symbol of the last repetition of the SPS PDSCH with AF. The gNB 20 may then use the determination to transmit a release PDCCH according to the specified timing (e.g., generates a release PDCCH that specifies the configuration index of the SPS PDSCH with aggregation factor that is to be released) to control the UE 10 to release the identified SPS PDSCH with aggregation factor. In some embodiments, the gNB 20 uses the determination to control whether or not data is transmitted in the SPS PDSCH with AF (e.g., whether or not the SPS PDSCH with AF is released).

According to another embodiment of the present disclosure, it is not supported that a release PDCCH is received in a PDCCH slot indicating the release of a SPS PDSCH configured with an aggregation factor AF≥1 on the PDSCH cell such that: 1) at least for one occasion among the AF occasions of the SPS PDSCH, the end of a last symbol of the PDCCH reception is not after the end of a last symbol of the SPS PDSCH occasion reception and 2) the ACK/NACK of the SPS PDCCH release and ACK/NACK of the SPS PDSCH would be mapped to the same PUCCH.

FIG. 16 is a schematic diagram depicting a cross-carrier SPS PDSCH release. Generally, the decoding of downlink control information (DCI) decoding takes longer on a cell with lower SCS than on a cell with higher SCS. FIG. 16 depicts one example of a SPS PDSCH 1600 on a cell 1640 with a higher SCS=120 KHz that is released by a release PDCCH 1670 on a cell 1680 with a lower SCS=15 KHz. In the worst case, the UE 10 may unnecessarily decode the SPS PDSCH 1600 as the DCI may take too long to decode due to being received on a cell 1680 with lower SCS than the cell 1640 on which the SPS PDSCH 1600 was received.

In addition, the UE 10 may have finished the SPS PDSCH decoding process before it has finished the PDCCH decoding process and therefore prepared an ACK/NACK value for the SPS PDSCH 1600. In the example shown in FIG. 16, it takes the UE 10 a shorter time 1602 to decode the SPS PDSCH 1600, and it takes the UE 10 a longer time 1672 to decode the release PDCCH 1670, such that the SPS PDSCH 1600 is decoded at time 1604 (indicated by the dashed line) that is before the time 1674 at which the release PDCCH 1670 is decoded. However, once the UE 10 decodes the release PDCCH 1670, the UE 10 may need to update the value of the ACK/NACK, such as by replacing the ACK/NACK for the SPS PDSCH 1600 with the ACK/NACK of the release DCI of the PDCCH 1670. This may interrupt UE 10 operations, depending on how the ACK/NACK preparation is implemented in hardware. In particular is it possible for UE 10 to update the value of an ACK/NACK bit in a payload after it has generated the full payload or it sequentially feeds the values into a buffer when they are known. In the latter case, according to some embodiments of the present disclosure, a time offset may be introduced from the end of PDCCH to the beginning of SPS PDSCH to provide enough time to update the ACK/NACK bit of the payload accordingly.

Figure 17:
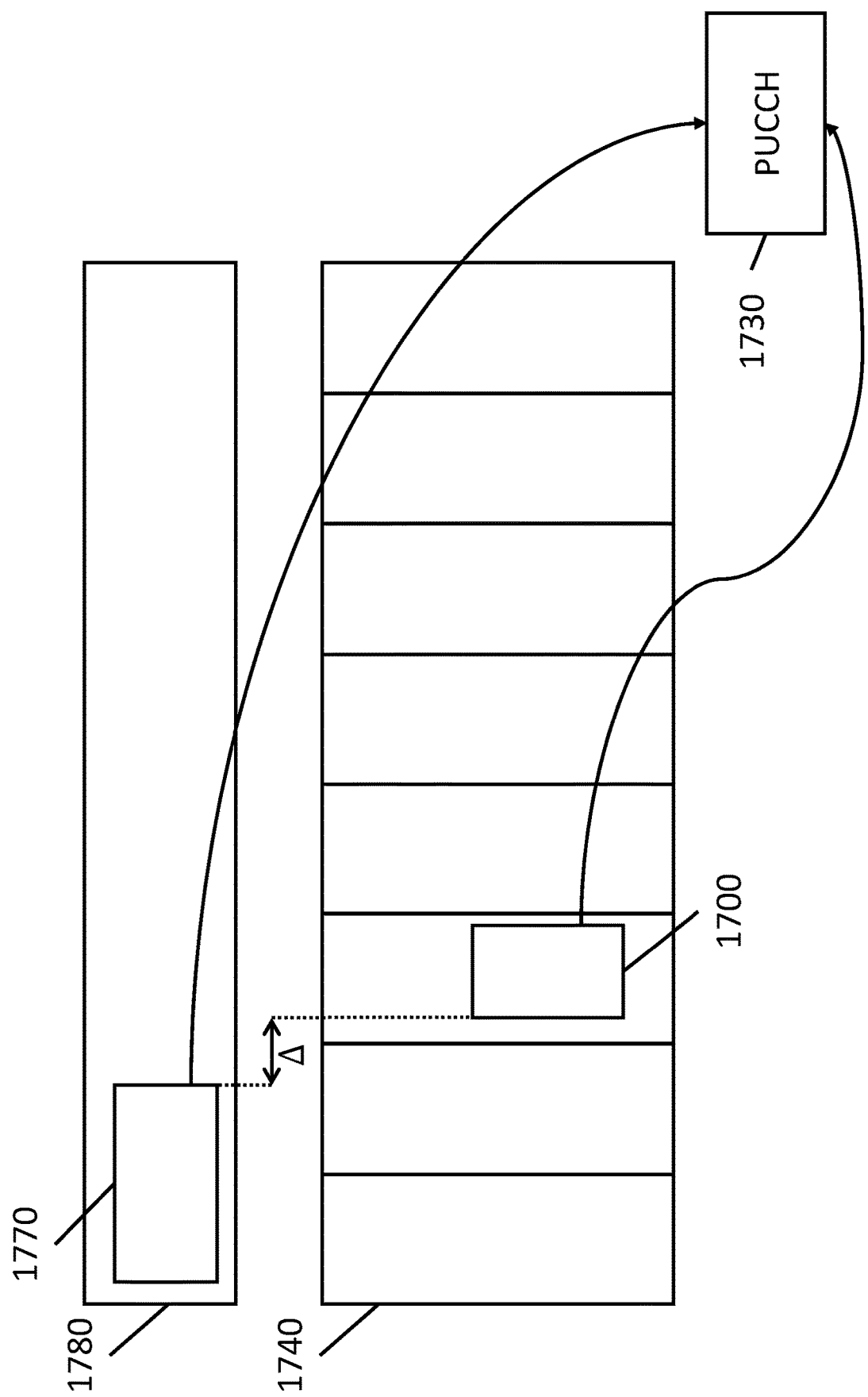
FIG. 17 is a schematic diagram depicting a cross-carrier SPS PDSCH release according to one embodiment of the present disclosure.

FIG. 17 is a schematic diagram depicting a cross-carrier SPS PDSCH release according to one embodiment of the present disclosure. As shown in FIG. 17, a SPS PDSCH 1700 in scheduled cell 1740 is released by a release PDCCH 1770 in a scheduling slot 1780, where the ACK/NACK of the SPS PDSCH and the ACK/NACK of the release PDCCH 1770 are mapped to the same PUCCH 1730.

According to one embodiment of the present disclosure, a UE 10 is not expected to receive a SPS release PDCCH 1770 in a slot of scheduling cell indicating the release of a SPS PDSCH 1700 in a slot of scheduled cell if a) the ACK/NACK of the SPS PDSCH 1700 and the ACK/NACK of the SPS release PDCCH 1770 are mapped to the same PUCCH 1730 and b) the end of the ending symbol of the SPS PDSCH 1700 is less than d symbols (in the numerology of SPS PDSCH) after the end of the ending symbol of the SPS release PDCCH 1770. In other words, the UE 10 supports a SPS release PDCCH 1770 in a slot of scheduling cell indicating the release of a SPS PDSCH 1700 in a slot of the scheduled cell if a) the ACK/NACK of SPS PDSCH 1700 and the ACK/NACK of SPS Release PDCCH 1770 are mapped to the same PUCCH 1730 and b) the end of the ending symbol of the SPS PDSCH 1700 is at least d symbols after the end of the ending symbol of the SPS release PDCCH 1770. In some embodiments, d corresponds to the length of the gap (labeled Δ in FIG. 17) from the end of the ending symbol of SPS release PDCCH 1770 to the starting symbol of the SPS PDSCH 1700 (e.g., d is the number of SPS PDSCH symbols that can be transmitted during the period of the gap Δ) in case of cross-carrier scheduling with different numerologies in Rel-16 of the 3GPP 5G NR specifications. In some embodiments, d is defined as one of several possible values, and a UE 10 can declare or advertise support of one or more values of d as a capability of the UE 10 (e.g. based on hardware and/or firmware support at the UE for different values of d). In some embodiments, the value of d can be zero, and support of cross-carrier SPS release with mixed numerology is specified or advertised to the gNB 20 as a capability of the UE 10. As such, some embodiments of the present disclosure relate to a system and method for cross-carrier release of SPS PDSCHs, where the gNB 20 transmits the SPS release PDCCH with a timing such that the end of the ending symbol of the SPS release PDCCH is at least d symbols before the end of the ending symbol of the SPS PDSCH to be released.

In some embodiments, the UE 10 is not expected to receive a SPS release PDCCH 1770 in a slot of scheduling cell indicating the release of a SPS PDSCH 1700 in a slot of scheduled cell if a) the ACK/NACK of the SPS PDSCH 1700 and the ACK/NACK of SPS Release PDCCH 1770 are mapped to the same PUCCH 1730 and b) the starting symbol of the SPS PDSCH 1700 is less than d symbols (in the numerology of SPS PDSCH) after the end of the ending symbol of the SPS release PDCCH 1770. In other words, the UE 10 supports a SPS release PDCCH 1770 in a slot of scheduling cell indicating the release of a SPS PDSCH 1700 in a slot of scheduled cell if a) the ACK/NACK of the SPS PDSCH 1700 and the ACK/NACK of SPS Release PDCCH 1770 are mapped to the same PUCCH 1730 and b) the starting symbol of the SPS PDSCH 1700 is at least d symbols (in the numerology of SPS PDSCH) after the end of the ending symbol of the SPS release PDCCH 1770. As such, some embodiments of the present disclosure relate to a system and method for cross-carrier release of SPS PDSCHs, where the gNB 20 transmits the SPS release PDCCH with a timing such that the end of the ending symbol of the SPS release PDCCH is at least d symbols before the starting symbol of the SPS PDSCH to be released.

Accordingly, various aspects of embodiments of the present disclosure relate to systems and methods for handling the release of SPS PDSCH, including circumstances involving collision handling between PDSCHs, joint release of PDSCHs, and PDSCHs configured with aggregation factors.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for jointly releasing multiple semi-persistently scheduled (SPS) physical downlink shared channels (PDSCHs), the method comprising:
receiving, by a PDSCH manager of a user equipment comprising a processor and memory, a SPS release physical downlink control channel (PDCCH) in a scheduling cell, the SPS release PDCCH identifying N SPS PDSCH configuration indices $i_1, \ldots, i_N$ to be released;
identifying, by the PDSCH manager, a slot of a scheduled cell, where the slot of the scheduled cell overlaps with the end of an ending symbol of the SPS release PDCCH;
identifying, by the PDSCH manager, M SPS PDSCH configuration indices $j_1, \ldots, j_M$ comprising all configuration indices from among the N SPS PDSCH configuration indices that are configured to be received in the slot, where M≤N, the M SPS PDSCH configuration indices being associated with corresponding ending symbols;
comparing, by the PDSCH manager, timings of the end of the ending symbol of the SPS release PDCCH and the end of the corresponding ending symbols of the M SPS PDSCH configuration indices of the slot; and
releasing, by the PDSCH manager, L SPS PDSCH configuration indices among the M SPS PDSCH configuration indices based on determining that the ending symbol of the SPS release PDCCH is before a corresponding ending symbol associated with each of the L SPS PDSCH configuration indices of the slot.

2. The method of claim 1, wherein an acknowledgement/negative-acknowledge bit (ACK/NACK) of the SPS release PDCCH and an ACK/NACK of L SPS PDSCH occasions from among a plurality of SPS PDSCH occasions identified by the M SPS PDSCH configuration indices are mapped to a same physical uplink control channel (PUCCH).

3. The method of claim 1, wherein the scheduling cell has a first subcarrier spacing and the scheduled cell has a second subcarrier spacing different from the first subcarrier spacing.

4. The method of claim 3, wherein the first subcarrier spacing of the scheduling cell is lower than the second subcarrier spacing of the scheduled cell.

5. The method of claim 3, wherein the first subcarrier spacing of the scheduling cell is higher than the second subcarrier spacing of the scheduled cell.

6. A method for identifying jointly released multiple semi-persistently scheduled (SPS) physical downlink shared channels (PDSCHs), the method comprising:
identifying, by a PDSCH manager of a base station comprising a processor and memory, a slot of a scheduled cell that will overlap with the end of an ending symbol of a SPS release physical downlink control channel (PDCCH) identifying N SPS PDSCH configuration indices to be jointly released;
identifying, by the PDSCH manager, M SPS PDSCH configuration indices $j_1, \ldots, j_M$ comprising all configuration indices from among the N SPS PDSCH configuration indices that are configured in the slot, where M≤N, the M SPS PDSCH configuration indices being associated with corresponding ending symbols;
comparing, by the PDSCH manager, timings of the ending symbol of the SPS release PDCCH and the corresponding ending symbols of the M SPS PDSCH configuration indices of the slot;
identifying, by the PDSCH manager, L released SPS PDSCH configuration indices among the M SPS PDSCH configuration indices based on determining that the ending symbol of the SPS release PDCCH is before a corresponding ending symbol associated with each of the L released SPS PDSCH configuration indices of the slot; and
transmitting, by the base station, the SPS release PDCCH generated based on the determination that the ending symbol of the SPS release PDCCH is before the corresponding ending symbol associated with each of the identified L released SPS PDSCH configuration indices of the slot.

7. The method of claim 6, wherein an acknowledgement/negative-acknowledge bit (ACK/NACK) of the SPS release PDCCH and an ACK/NACK of L SPS PDSCH occasions from among a plurality of SPS PDSCH occasions identified by the M SPS PDSCH configuration indices are mapped to a same physical uplink control channel (PUCCH).

8. The method of claim 6, wherein the scheduling cell has a first subcarrier spacing and the scheduled cell has a second subcarrier spacing different from the first subcarrier spacing.

9. The method of claim 8, wherein the first subcarrier spacing of the scheduling cell is lower than the second subcarrier spacing of the scheduled cell.

10. The method of claim 8, wherein the first subcarrier spacing of the scheduling cell is higher than the second subcarrier spacing of the scheduled cell.

11. A method for releasing a semi-persistently scheduled (SPS) physical downlink shared channel (PDSCH) with an aggregation factor, the method comprising:
receiving, by a PDSCH manager of a user equipment comprising a processor and memory, a SPS release physical downlink control channel (PDCCH) in a scheduling cell, the SPS release PDCCH identifying a SPS PDSCH configuration index, the SPS PDSCH configuration index being associated with a SPS PDSCH configured with an aggregation factor in a scheduled cell;
identifying, by the PDSCH manager, a timing of an ending symbol of a last repetition of the SPS PDSCH configured with the aggregation factor;
comparing, by the PDSCH manager, a timing of an ending symbol of the SPS release PDCCH with the timing of the last symbol of the last repetition of the SPS PDSCH configured with the aggregation factor; and
releasing, by the PDSCH manager, the SPS PDSCH configuration index based on determining that the ending symbol of the SPS release PDCCH is before the last symbol of the last repetition of the SPS PDSCH configured with the aggregation factor.

12. The method of claim 11, wherein an acknowledgement/negative-acknowledge bit (ACK/NACK) of the SPS release PDCCH and an ACK/NACK of the SPS PDSCH configured with the aggregation factor are mapped to a same physical uplink control channel (PUCCH).

13. The method of claim 11, wherein the scheduling cell has a first subcarrier spacing and the scheduled cell has a second subcarrier spacing different from the first subcarrier spacing.

14. The method of claim 13, wherein the first subcarrier spacing of the scheduling cell is lower than the second subcarrier spacing of the scheduled cell.

15. The method of claim 11, wherein the SPS release PDCCH identifies a plurality of SPS PDSCH configuration indices to be released.

16. A method for identifying a released semi-persistently scheduled (SPS) physical downlink shared channel (PDSCH) with aggregation factor (AF), the method comprising:
- identifying, by a PDSCH manager of a base station comprising a processor and memory, a timing of an ending symbol of a last repetition of the released SPS PDSCH with AF in a scheduled cell;
- identifying, by the PDSCH manager, a timing of an ending symbol of a SPS release physical downlink control channel (PDCCH) in a scheduling cell;
- comparing, by the PDSCH manager, the timing of the ending symbol of the SPS release PDCCH and the timing of the ending symbol of the last repetition of the released SPS PDSCH with AF; and
- releasing, by the PDSCH manager, the released SPS PDSCH with AF based on determining that the ending symbol of the SPS release PDCCH is before the ending symbol of the last repetition of the released SPS PDSCH with AF.

17. The method of claim 16, wherein an acknowledgement/negative-acknowledge bit (ACK/NACK) of the SPS release PDCCH and an ACK/NACK of the SPS PDSCH configured with the aggregation factor are mapped to a same physical uplink control channel (PUCCH).

18. The method of claim 17, wherein the scheduling cell has a first subcarrier spacing and the scheduled cell has a second subcarrier spacing different from the first subcarrier spacing.

19. The method of claim 18, wherein the first subcarrier spacing of the scheduling cell is lower than the second subcarrier spacing of the scheduled cell.

20. The method of claim 16, wherein the SPS release PDCCH identifies a plurality of SPS PDSCH configuration indices to be released.

* * * * *